(12) United States Patent
Gordon et al.

(10) Patent No.: US 11,733,379 B2
(45) Date of Patent: *Aug. 22, 2023

(54) SURFACE TYPE DETECTION

(71) Applicant: InvenSense, Inc., San Jose, CA (US)

(72) Inventors: James Alexander Gordon, El Cerrito, CA (US); David Horsley, Berkeley, CA (US); Sebastien Riccardi, Brezins (FR)

(73) Assignee: InvenSense, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,618

(22) Filed: Jul. 11, 2022

(65) Prior Publication Data

US 2022/0342069 A1 Oct. 27, 2022

Related U.S. Application Data

(63) Continuation of application No. 16/836,669, filed on Mar. 31, 2020, now Pat. No. 11,397,262.

(60) Provisional application No. 62/938,353, filed on Nov. 21, 2019.

(51) Int. Cl.
*G01S 15/50* (2006.01)
*A47L 11/30* (2006.01)
*G01S 7/52* (2006.01)
*A47L 11/40* (2006.01)

(52) U.S. Cl.
CPC ............ *G01S 15/50* (2013.01); *A47L 11/302* (2013.01); *A47L 11/4011* (2013.01); *G01S 7/52079* (2013.01); *G01S 7/52085* (2013.01); *A47L 2201/04* (2013.01)

(58) Field of Classification Search
CPC .. G01S 15/50; G01S 7/52079; G01S 7/52085; G01S 7/521; G01S 7/527; G01S 7/539; G01S 7/52004; G01S 15/88; A47L 11/302; A47L 11/4011; A47L 2201/04; A47L 9/281; A47L 9/2857; A47L 9/2894; A47L 2201/022; A47L 2201/06
See application file for complete search history.

(56) References Cited

U.S. PATENT DOCUMENTS

| 7,424,766 | B2 | 9/2008 | Reindle et al. |
| 10,551,843 | B2 | 2/2020 | Yee et al. |
| 11,397,262 | B2 * | 7/2022 | Gordon .............. G01S 7/527 |
| 2004/0204792 | A1 | 10/2004 | Taylor et al. |

(Continued)

*Primary Examiner* — Daniel Pihulic

(57) ABSTRACT

A robotic cleaning appliance includes a housing, surface treatment item, surface type detection sensor, and processor. The sensor emits sonic signals toward a surface being traversed and receives corresponding returned signals from the surface. The returned signals are used for surface type detection and include directly reflected primary returned signals and multi-path reflected secondary returned signals which return at a later time than the primary returned signals. The processor selects a window of time after transmission of a sonic signal such that the returned signals in the window comprise at least a portion of the secondary returned signals, wherein the window is related to round trip time-of-flight of the returned signals; processes the returned signals falling in the window to achieve a reflectivity metric; compares the reflectivity metric to a stored value; and based on the comparison, determines which surface type of a plurality of surface types has been detected.

25 Claims, 15 Drawing Sheets

(56) References Cited

U.S. PATENT DOCUMENTS

| | | |
|---|---|---|
| 2005/0000543 A1 | 1/2005 | Taylor et al. |
| 2005/0010331 A1 | 1/2005 | Taylor et al. |
| 2021/0156993 A1 | 5/2021 | Gordon et al. |
| 2022/0342069 A1* | 10/2022 | Gordon .................. A47L 9/281 |

* cited by examiner

800 CONTINUED

DETECT A MALFUNCTION OF THE ROBOTIC CLEANING APPLIANCE BASED ON THE REFLECTIVITY METRIC BEING DETERMINED TO HAVE CHANGED BEYOND A THRESHOLD FROM A PREVIOUSLY DETERMINED REFLECTIVITY METRIC
870

800 CONTINUED

BASED ON THE DETERMINATION OF SURFACE TYPE, TRIGGER A ROBOT TO TAKE AN ACTION
875

SURFACE TYPE DETECTION

CROSS-REFERENCE TO RELATED APPLICATIONS

This application claims priority to and is a continuation of the co-pending U.S. patent application Ser. No. 16/836,669, entitled "Surface Type Detection," by James Alexander Gordon et al., with filing date Mar. 31, 2020, and assigned to the assignee of the present application, the disclosure of which is hereby incorporated herein by reference in its entirety.

This application claims priority to and benefit of U.S. Provisional Patent Application No. 62/938,353 filed on Nov. 21, 2019 entitled "SURFACE TYPE DETECTION FOR DEVICES MOVING OR OPERATING ON A SURFACE" by James Alexander Gordon et al., and assigned to the assignee of the present application, the disclosure of which is hereby incorporated herein by reference in its entirety.

BACKGROUND

A variety of devices exist which move about on or operate on floors or other surfaces such as walls, windows, roofs, tables, countertops, sidewalks, roads, and the like. The surfaces may be indoor surfaces, outdoor surfaces, or some combination. One or more examples of such a device may be semi-autonomous, by which is meant that while operating on one or more surfaces some functions of the device are controlled by a human and some are automated. One or more examples of such a device may be robotic, by which is meant that while operating on one or more surfaces some or all functions of the device may operate autonomously under the control of one or more processors. Some examples of these devices may include, but are not limited to: remote control vehicles, telepresence robots, electric scooters, electric wheelchairs, wheeled delivery robots, flying drones operating near a surface or about to land on or take off from a surface, wheeled delivery vehicles, floor vacuums, and robotic cleaning appliances (which include robotic floor cleaners and/or robotic floor vacuums).

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1A:
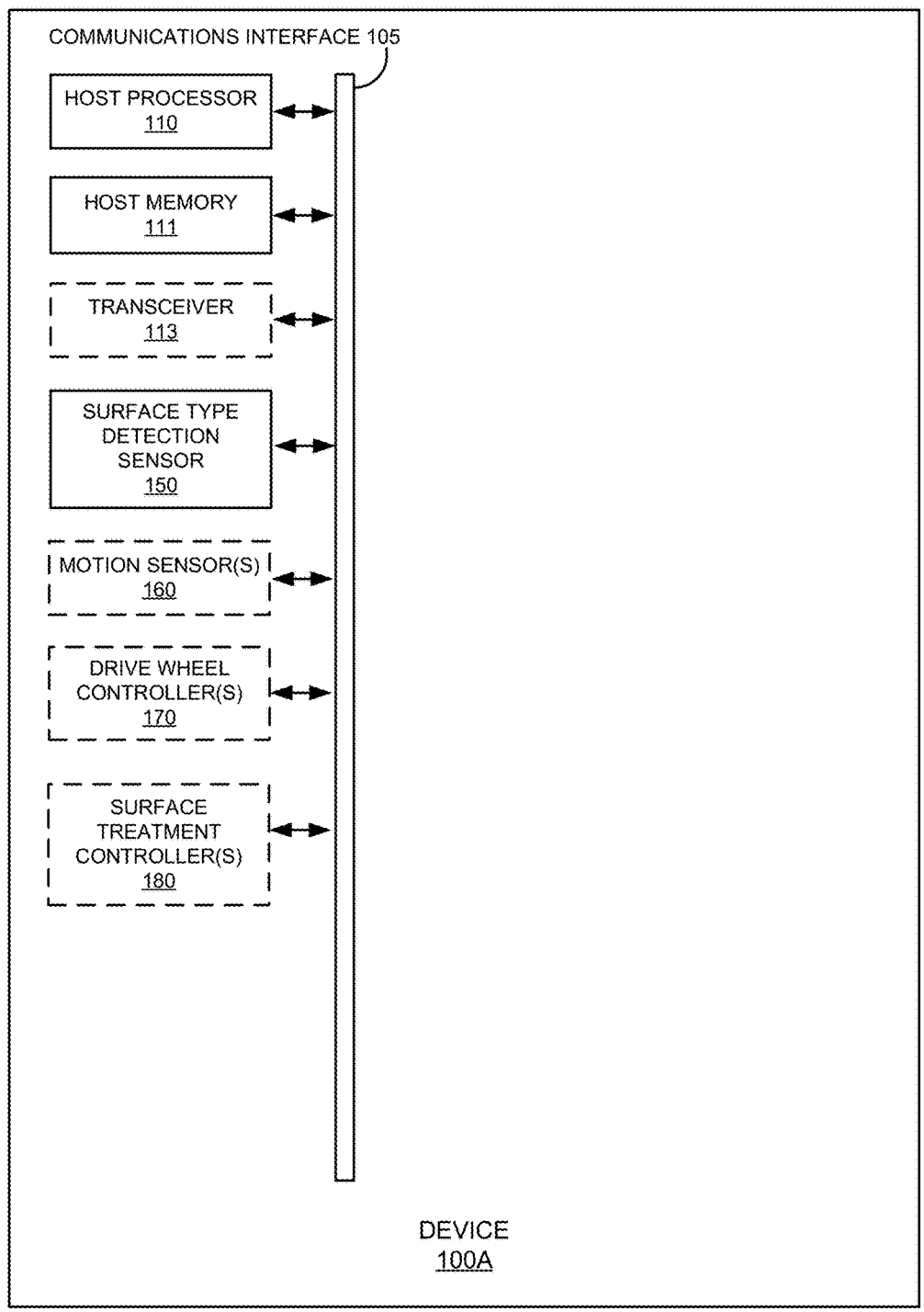
FIGS. 1A and 1B show example block diagrams of some aspects of a device which moves about or operates on a surface, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

A variety of devices which move about on or operate on floors or other surfaces may benefit from being able to determine information about surface upon which they are moving or operating. Surfaces may include floors, building exteriors, windows, dirt, gravel, fabric, roofing, roads, sidewalks, trails, water (or other liquid), etc. A surface may be flat and smooth or rough and textured. In some embodiments, the surface may be fixed while the device operates upon or moves upon the surface. In other embodiments, the surface may move while the device remains fixed or moves relative to the moving surface. There are a variety of broad "surface types," upon which such devices may operate or move. According to some aspects, these "surface types" can be divided into two major groups, hard surfaces and soft surfaces. In some embodiments, there may be sub-groups in each of these two major groups. In some embodiments, there may be additional or alternative "major groups" such as wet, dry, clean, dirty, etc.

For purposes of example and not of limitation, consider flooring surfaces which can be divided into hard floors and soft floors. Hard floors include flooring surfaces such as, but not limited to: tile, wood, linoleum, laminate flooring, metal, terrazzo, concrete, stone, and the like. Soft floors include flooring surfaces such as, but not limited to: rugs, sculptured carpet, low pile carpet, cut pile carpet, high pile carpet, and other types of carpeting, and the like. Although, flooring has been described as being dividable into two major categories of hard surfaces and soft surfaces; flooring surfaces may be divided in any number of categories varying from hard to soft (e.g., hard, medium hard, medium soft, soft, etc.).

During the operation of a device on a surface or as it moves about on a surface, it may be advantageous for the device to detect information about the surface, such as whether it is wet (and in some instances how wet on a scale of wetness), dirty (and in some instances, how dirty and/or dirty with what), dry, hard (and in some instances, how hard on a scale of hardness), soft (an in some instances how soft on a scale of softness), etc. As will be described herein, such detection of a surface type may involve emitting sonic signals toward the surface and processing returned sonic signals to determine the surface type. These sonic signals may include signals in one or more of the infrasound range, the acoustic range, and ultrasonic range. Returned signals include direct returned signals (which are emitted and bounce directly to a receiver) and secondary returned signals (which are multi-path reflected prior to being arriving at a receiver).

Some embodiments herein describe techniques for utilizing secondary returned signals in the detection/determination of surface type (e.g., where the returned signals processed to determine surface type include: some secondary returned signals, mostly secondary returned signals, or all secondary returned signals). In some embodiments, the amount of secondary returned signal may be adjusted to make the system more or less sensitive to the surface type, or a difference in surface type. For example, the softer or absorbent the surface, the less contributions are obtained from higher order reflections. Additionally, some embodiments describe an acoustic interface (e.g., a tube, a cavity, a horn, some combination thereof, etc.) which is coupled with a surface type detection sensor (e.g., a sonic or ultrasonic transducer or transmitter) in order to direct emitted sonic signals and to decrease/limit the amount of secondary returned signals. That is, use of certain types of acoustic interface may limit an acoustic field of view of a sensor such that the sensor is even more selective in the secondary returned signals received. In combination, in some embodiments, secondary signals may be processed for surface type detection while simultaneously, and purposely, collecting these secondary returned signals via an acoustic interface (e.g., a tube, a cavity, a horn, some combination thereof, etc.) configured to decrease/limit the amount of secondary returned signals received by a receiver. One reason for the preferential use of secondary returned signals is that it has been found that, in comparison to using only or mostly primary returned signals, the difference in amplitude or other characteristic(s) in secondary returned signals is pronounced enough between hard floors and soft floors that it substantially eases and improves the discrimination between hard floors and soft floors by reducing noise and other undesired reflections that may be present along with primary signals.

Discussion begins with a description of notation and nomenclature. Discussion then shifts to description of some block diagrams of example components of some example devices which moves about or operate on a surface. Some example depictions of a device, in the form of robotic cleaning appliance, are discussed. Some examples depictions of a surface type detection sensor assembly are described. A test setup of floor materials is described along with data captured by surface type detection sensor assemblies crossing the test set up. Operation of a robotic cleaning appliance and components thereof are discussed in conjunction with description of an example method of operation of the robotic cleaning appliance. Finally, actions of a processor are discussed in conjunction with description of an example method of surface type detection.

Notation and Nomenclature

Some portions of the detailed descriptions which follow are presented in terms of procedures, logic blocks, processes, modules and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "emitting," "receiving," "selecting," "processing," "comparing," "determining," "adjusting," "detecting," "summing," "obtaining," "storing," or the like, refer to the actions and processes of an electronic device or component such as: a host processor, a sensor processing unit, a sensor processor, a digital signal processor or other processor, a memory, a surface type detection sensor (e.g., a sonic emitter and a sonic receiver combo or a sonic transducer), a robotic cleaning appliance, a device configured to operate on or move about a surface, some combination thereof, or the like. The electronic device/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer or electronic device to perform one or more of the methods described herein. The non-transitory processor-readable data storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

In various example embodiments discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS circuits but others are possible and anticipated. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

Some embodiments may, for example, comprise a surface type detection sensor. This sensor may be any suitable sonic sensor operating in any suitable sonic range. For example, in some embodiments, the surface type detection sensor may be an ultrasonic sensor which utilizes a MEMS ultrasonic transducer. In some embodiments, the surface type detection sensor may include digital signal processor (DSP) which may be disposed as a part of an ASIC which may be integrated into the same package as a transducer. One example of such an ultrasonic sensor which may be utilized with various embodiments, without limitation thereto, is the CH101 ultrasonic range sensor from Chirp Microsystems, a TDK Group Company, of Berkley, Calif. The CH101 is only one example of an ultrasonic sensor, other types and/or brands of ultrasonic sensors may be similarly utilized.

Some embodiments may, for example, comprise one or more motion sensors. For example, an embodiment with an accelerometer, a gyroscope, and a magnetometer or other compass technology, which each provide a measurement along three axes that are orthogonal relative to each other, may be referred to as a 9-axis device. In another embodiment three-axis accelerometer and a three-axis gyroscope may be used to form a 6-axis device. Other embodiments may, for example, comprise an accelerometer, gyroscope, compass, and pressure sensor, and may be referred to as a 10-axis device. Other embodiments may not include all the sensors or may provide measurements along one or more axes. Some or all of the sensors may be MEMS sensors. Some or all of the sensors may be incorporated in a sensor processing unit along with a sensor processor and disposed in a single semiconductor package.

In some embodiments, for example, one or more sensors may, be formed on a first substrate. Various embodiments may, for example, include solid-state sensors and/or any other type of sensors. The electronic circuits in a sensor processing unit may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package, such as a single integrated circuit.

Example Device which Moves about or Operates on a Surface

Figure 1B:
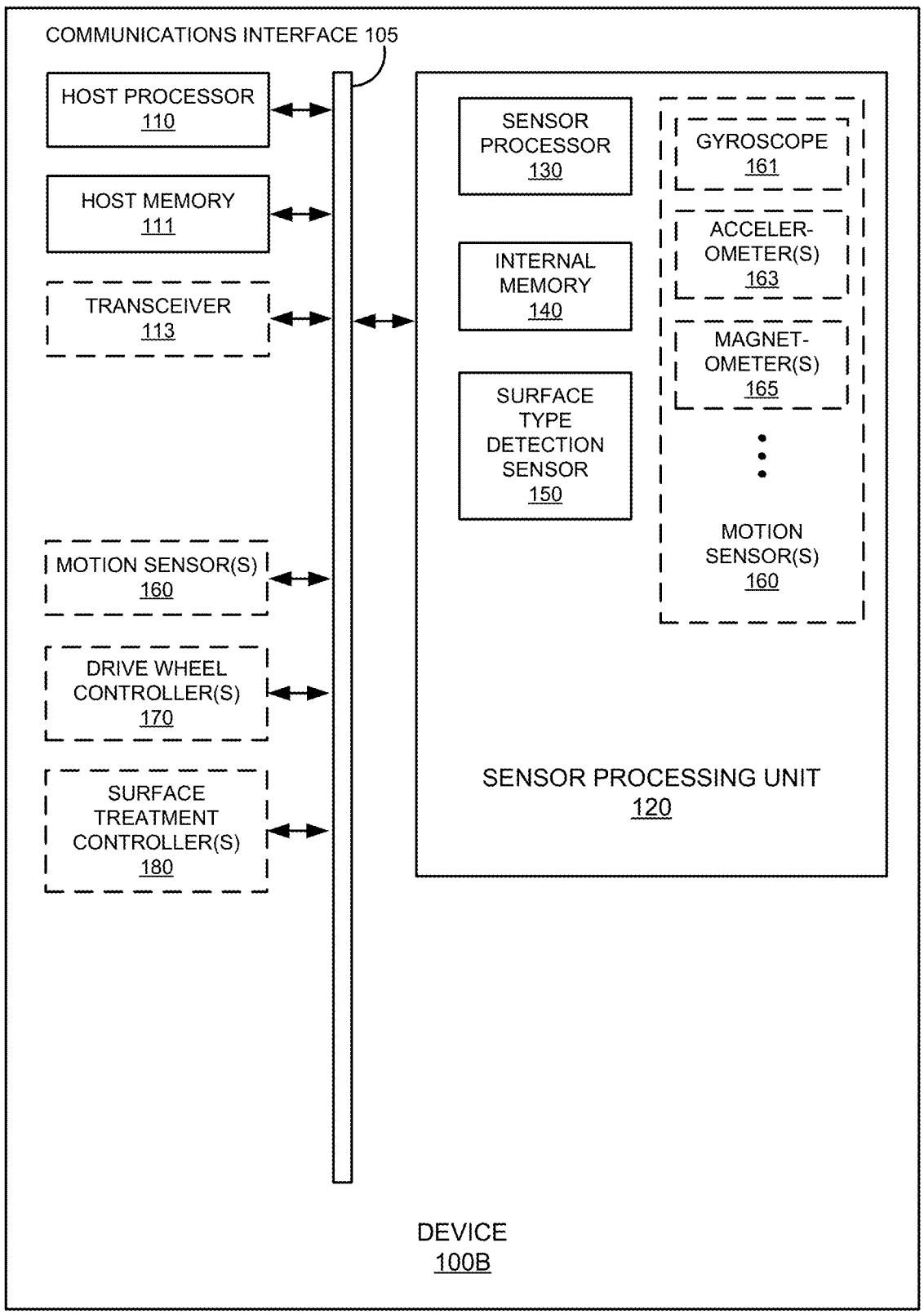

FIGS. 1A and 1B show some example components of a device 100 which moves about or operates on a surface. Some examples of a device 100 may include, but are not limited to: a remote control vehicles, a telepresence robot, an electric scooter, an electric wheelchair, a wheeled delivery robot, a flying drone operating near a surface or about to land on or take off from a surface, a wheeled delivery vehicle, a floor vacuum, and a robotic cleaning appliance (which include a robotic floor cleaner, a robotic floor vacuum, or combinations thereof).

FIG. 1A shows a block diagram of components of an example device 100A which moves about or operates on a surface, in accordance with various aspects of the present disclosure. As shown, example device 100A comprises a communications interface 105, a host processor 110, host memory 111, and at least one surface type detection sensor 150. In some embodiments, device 100 may additionally include one or more of a transceiver 113, one or more motion sensors 160, one or more drive wheel controllers 170, and one or more surface treatment controllers 180 (which may control a cleaning tool and/or any surface treatment item that may take an action based upon a surface type determination). Some embodiments may include sensors used to detect motion, position, surface type, or environmental context (e.g., nearby objects and/or obstacles, whether a surface is hard or soft, whether a surface is carpeted or not carpeted, whether a surface is clean or dirty, whether a surface is wet or dry, etc.); some examples of these sensors may include, but are not limited to, infrared sensors, cameras, microphones, and global navigation satellite system sensors (i.e., a global positioning system receiver). As depicted in FIG. 1A, included components are communicatively coupled with one another, such as, via communications interface 105.

The host processor 110 may, for example, be configured to perform the various computations and operations involved with the general function of device 100 (e.g., sending commands to move, steer, avoid obstacles, and operate/control the operation of tools). Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100.

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between SPU 120 and one or more of host processor 110, host memory 111, transceiver 113, surface type detection sensor 150, motion sensor(s) 160, drive wheel controller(s) 170, and/or surface treatment controller(s) 180.

Host memory 111 may comprise programs, modules, applications, or other data for use by host processor 110. In some embodiments, host memory 111 may also hold information that is received from or provided to sensor processing unit 120 (see e.g., FIG. 1B). Host memory 111 can be any suitable type of memory, including but not limited to electronic memory (e.g., read only memory (ROM), random access memory (RAM), or other electronic memory).

Transceiver 113, when included, may be one or more of a wired or wireless transceiver which facilitates receipt of data at device 100 from an external transmission source and transmission of data from device 100 to an external recipient. One example of an external transmission source/external recipient may be a base station to which device 100 returns for charging, maintenance, docking, etc. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired a serial transceiver (e.g., a universal serial bus for wired communication).

Surface type detection sensor 150 may be, a sonic transducer or a sonic emitter paired with a sonic receiver. In some embodiments, surface type detection sensor 150 is an ultrasonic transducer. Surface type detection sensor 150 is configured to emit sonic signals toward a surface and receive sonic returned signals. The sonic signals emitted may include signals in one or more of the infrasound range, the acoustic range, and ultrasonic range. Returned signals include direct returned signals (which are emitted and reflect directly to a receiver) and secondary returned signals (which are multi-path reflected prior to arriving at a receiver). In some embodiments, surface type detection sensor 150 may be part of a surface type detection sensor assembly 350 (see e.g., FIGS. 4A-4D), which may include an acoustic interface 450 (see e.g., FIGS. 4A-4D) such as a tube, cavity, horn, some combination thereof, or the like used to direct sonic signals toward a surface and sonic returned signals back to surface type detection sensor 150.

Motion sensor(s) 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure.

Drive wheel controller(s) 170 or other mechanism(s) to govern movement, when included, may include motor controllers, switches, and/or logic which operate under instruction to: drive one or more wheels or other mechanisms of movement (e.g., tank treads, propellers), change speed of rotation of a drive wheel or other mechanism of movement, moderate an amount of slip or spin permitted for a drive wheel, move a drive wheel or other mechanism of movement in a desired direction, stop a drive wheel or other mechanism of movement, and/or to steer device 100 using a drive wheel (such as via differential speed or rotation) or other mechanism of movement.

Surface treatment controller(s) 180, when included, may include motor controllers, switches, and or logic to turn on, turn off, and/or adjust the operation and/or orientation of one or more surface treatment items, such as cleaning tool(s) and/or other item(s) that take action based upon a surface type determination.

FIG. 1B shows a block diagram of components of an example device 100B which moves about or operates on a surface, in accordance with various aspects of the present disclosure. Device 100B is similar to device 100A except that it includes a sensor processing unit (SPU) 120 in which surface type detection sensor 150 is disposed. SPU 120, when included, comprises: a sensor processor 130; an internal memory 140; and at least one surface type detection sensor 150. In some embodiments, SPU 120 may additionally include one or more motion sensors 160 (e.g., gyroscope 161, accelerometer 163, magnetometer 165) and/or one or more other sensors such a light sensor, infrared sensor, GNSS sensor, microphone, etc. In various embodiments, SPU 120 or a portion thereof, such as sensor processor 130, is communicatively coupled with host processor 110, host memory 111, and other components of device 100 through communications interface 105 or other well-known means. SPU 120 may also comprise one or more communications interfaces (not shown) similar to communications interface 105 and used for communications among one or more components within SPU 120.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100, such as host processor 110.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by one or more of the motion sensors 160 and/or one or more surface type detection sensors 150. In some embodiments, internal memory 140 may store one or more modules which may be algorithms that execute on sensor processor 130 to perform a specific function. Some examples of modules may include, but are not limited to: statistical processing modules, motion processing modules, surface type detection modules, and/or decision-making modules.

Surface type detection sensor 150 may be, a sonic transducer or a sonic emitter paired with a sonic receiver. In some embodiments, surface type detection sensor 150 is an ultrasonic transducer, such as a PMUT (piezoelectric micromachined ultrasonic transducer). T Surface type detection sensor 150 may be a MEMS device and may be very small, such as having a facing surface of less than 4 mm by 4 mm by 1.5 mm. An ultrasonic sensor may be large or small, depending on the application and the space available. In some transducer embodiments, surface type detection sensor 150 may be resonant; meaning that it prefers to transmit and receive on the same frequency (e.g., 200 KHz). In some embodiments, surface type detection sensor 150 may be a SOC (system on a chip) which includes a DSP. In some embodiments, the SOC packaging of surface type detection sensor 150 comprises sensor processing unit 120 and includes sensor processor 130 and internal memory 140. In some embodiments, surface type detection sensor 150 may be part of a surface type detection sensor assembly (see e.g., FIGS. 4A-4D), which may include a tube used to direct sonic signals toward a surface and sonic returned signals back to surface type detection sensor 150.

Motion sensors 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure. Motion sensor(s) 160 are communicatively coupled with sensor processor 130 by a communications interface, bus, or other well-known communication means.

Example System

Figure 2:
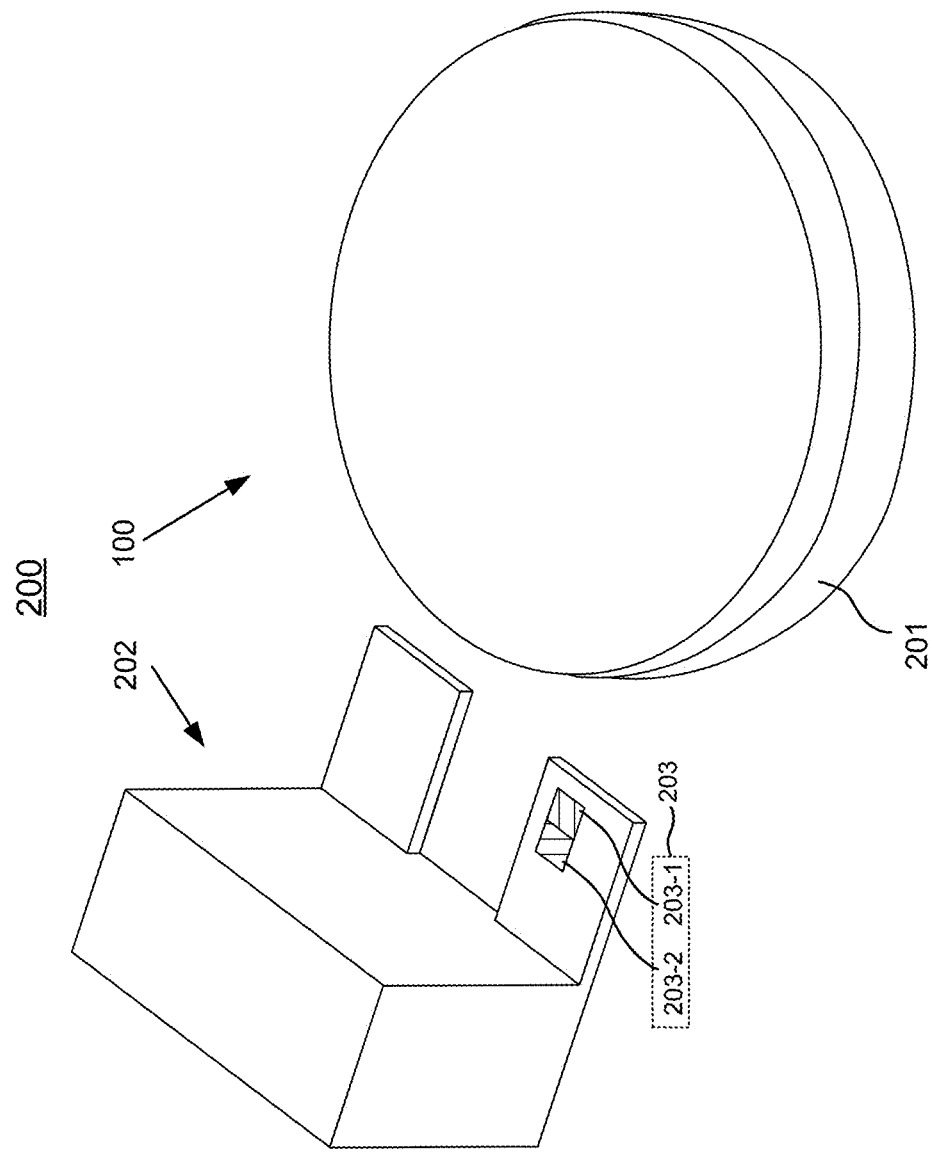
FIG. 2 shows an upper front perspective view of one example of a system which includes a device which moves about or operates on a surface and a base station for the device, in accordance with various embodiments.

FIG. 2 shows an upper front perspective view of one example of a system 200 which includes one embodiment of a device 100 which moves about or operates on a surface and also includes a base station 202 for the device 100, in accordance with various embodiments. Device 100 includes a housing 201 to which one or more items may be coupled. Base station 202 provides a location at which a device 100 may be positioned or parked or docked when not moving about or operating on a surface. In some embodiments, base station 202 (which may also be referred to as dock 202) may provide information/instructions to device 100 and/or receive information from device 100, such as via physical and/or wireless communication coupling to transceiver 113. In some embodiments, base station 202 may provide an electrical charger for device 100 such that, via physical or wireless (e.g., inductive) electrical coupling, base station 202 electrically charges device 100 when device 100 is coupled with or suitably oriented with base station 202. In some embodiments, base station 202 may provide one or more sample surfaces 203 (e.g., 203-1 and 203-2) which can be used to test or calibrate a surface type detection sensor and other electronics and/or computing resources used by device 100 to detect the type of surface upon which device 100 moves about or operates upon. For example, in some embodiments, one or more of a sample of a soft surface 203-1 and a sample of a hard surface 203-2 may be provided, at known locations to device 100, as a test target which device 100 may sense and detect while positioning itself in base station 202. In some embodiments, when two or more different types of sample surfaces 203 are positioned adjacent to one another, device 100 may also test detection of a transition from one surface type (e.g., a soft surface 203-1) to another surface type (e.g., a hard surface 203-2). In some instances, any portion of the surface of base station 202 may be similarly utilized in the fashion of sample surface 203.

Figure 3A:
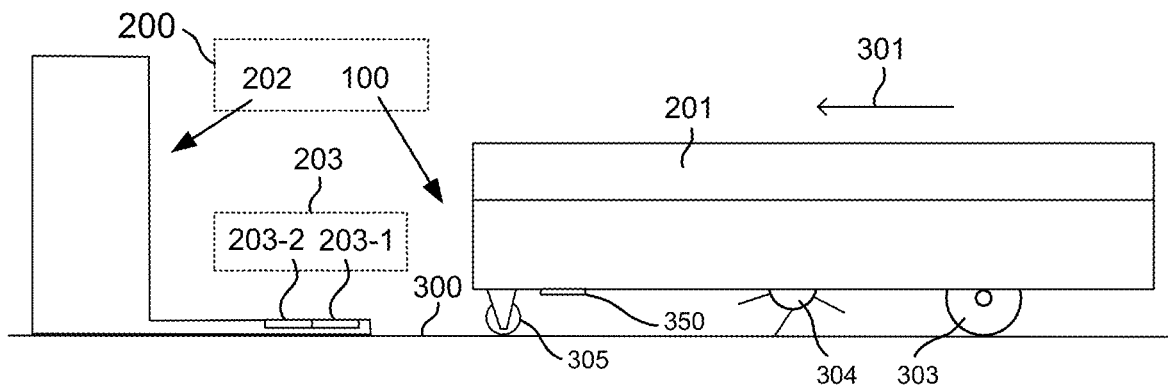
FIGS. 3A-3C show a side elevational view of one example of the system of FIG. 2, which includes a device which moves about or operates on a surface and a base station for the device, in accordance with various embodiments.
Figure 3B:
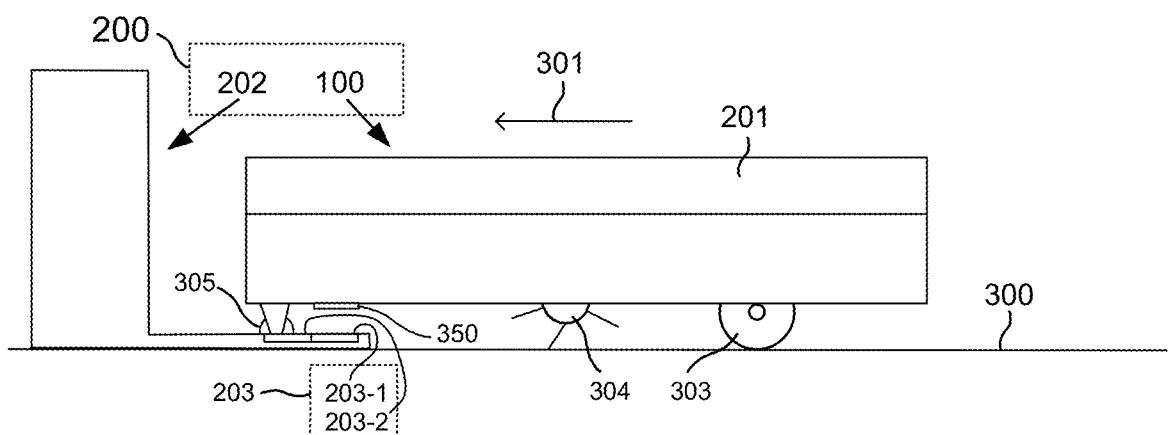
Figure 3C:
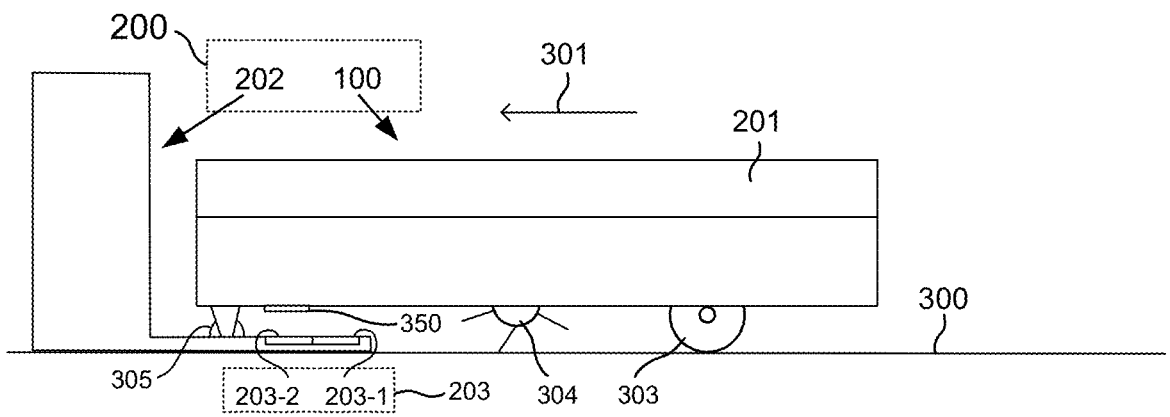

FIGS. 3A-3C show a side elevational view of the example of a system 200 of FIG. 2, which includes a device 100 which moves about or operates on a surface and a base station 202 for the device 100, in accordance with various embodiments. As illustrated in FIGS. 3A-3C, device 100 and base station 202 are disposed on a surface 300, upon which device 100 moves about and operates. Device 100 is depicted, by way of example and not of limitation, as a robotic cleaning appliance. Device 100 includes a surface type detection sensor assembly 350 coupled with housing 201 or any suitable portion of device 100. The surface type detection sensor assembly 350 includes a surface type detection sensor 150 (as will be described in conjunction with FIG. 4A). Although surface type detection sensor assembly 350 is shown on the bottom of device 100 and directed toward surface 300 (e.g., toward the floor), in other embodiments, a surface type detection sensor assembly 350 may additionally or alternatively be disposed on the top, side, or other portion for detecting vertical surfaces (e.g., walls) and/or overhanging surfaces. Device 100 may include one or more wheels 303 and/or 305, which may be driven and/or controlled by drive wheel controller(s) 170. Device 100 may include one or more surface treatment items, such as surface treatment item 304, which may be driven and/or controlled by surface treatment controller(s) 180. The depiction of surface treatment item 304 is merely an example and is not meant to limit the type of surface treatment item, tool, or tools represented by the depiction. Without limitation thereto, surface treatment item 304 may comprise one or more or some combination of: a suction tool or suction opening with respect to a floor surface of floor 300 or other surface; a rotary tool (e.g., a roller brush or broom); a sweeping tool (e.g., a broom); a wiping tool (e.g., a cloth/cloth covered surface); a brushing tool (e.g., a fixed or movable brush head); a dusting tool; a mopping tool; and a spraying tool configured to spray a cleaner or other liquid.

In FIG. 3A, device 100 is traveling in direction 301 on surface 300 and is preparing to dock with base station 202. In FIG. 3B, device 100 is still traveling in direction 301 on surface 300 and is beginning to dock with base station 202. In FIG. 3C, device 100 is still traveling in direction 301 and has nearly completed docking with base station 202.

With reference to FIG. 3A, sonic signals may be emitted from an opening in surface type detection sensor assembly 350, toward surface 300, and corresponding returned signals received from the surface 300 may be utilized by device 100 to detect a surface type of surface 300. In embodiments where a surface type detection sensor assembly 350 is located on another portion of device 100 (e.g. a side or top portion) the surface may be a horizontal surface such as a wall, or an overhang such as the underside of a coffee table or chair.

With reference to FIG. 3B, sonic signals may be emitted from an opening in surface type detection sensor assembly 350, toward sample surface 203-1, and corresponding returned signals received from the sample surface 203-1 may be utilized by device 100 to detect a surface type of sample surface 203-1. Because the location and surface type of sample surface 203-1 are known to device 100 this detection operation may be utilized to calibrate detection of these types of surfaces (e.g., soft surfaces), to store received returned signals as an exemplar to which other signals may be compared, to store a reflectivity metric associated with sample surface 203-1 as an exemplar for comparing to other reflectivity metrics, to detect for malfunctions or changes in the operation of a surface type detection sensor (such as changes over time, due to debris and/or dust particle accumulation, due to changes in temperature, aging, damage, humidity, mounting angle, etc.). In this manner sample surface(s) 203 (or other known surfaces) may utilized for calibration of surface type detection sensor assembly 350.

With reference to FIG. 3C, sonic signals may be emitted from an opening in surface type detection sensor assembly 350, toward sample surface 203-2, and corresponding returned signals received from the sample surface 203-2 may be utilized by device 100 to detect a surface type of sample surface 203-2. Because the location and surface type of sample surface 203-2 are known to device 100 this detection operation may be utilized to calibrate detection of these types of surfaces (e.g., hard surfaces), to store received returned signals as an exemplar to which other signals may be compared, to store a reflectivity metric associated with sample surface 203-2 as an exemplar for comparing to other reflectivity metrics, to detect for malfunctions or changes in the operation of a surface type detection sensor (such as changes over time, due to debris accumulation, due to changes in temperature, etc.). Similarly, when a plurality of sample surfaces abut one another or are closely adjacent, the transition from one sample surface 203-1 to the next sample surface 203-1 may be utilized to test the ability to detect such surface type changes.

With respect to calibration. In some embodiments, the amount of a sonic signal transmitted by the surface type detection sensor 150 may vary from sensor to sensor and may also vary for an individual during the lifetime of surface type detection sensor 150. Therefore, a calibration procedure may be used to improve the accuracy of the surface type determination. By knowing the amount of signal transmitted and/or the percentage of a transmitted signal received as a returned signal from a specific surface type, the reflected returned signal from any surface type can be more precisely characterized. Calibration may be done by measuring the reflection of returned signals from a known surface. For example, the sensor may be calibrated when device 100 is in a docking/charging base station 202 where the surface type below the device 100 is historically known due to repeated measurements during docking and undocking with the base station 202. The base station 202 may have one or more specially dedicated surface sample surface segments 203 (203-1, 203-2) which may be additionally or alternatively used for the calibration.

In some embodiments, one or more sample surfaces 203 may be incorporated into a removable protective covering (e.g., removeable protective covering 445 in FIG. 4G) which may be moved in place to cover a portion of surface type detection sensor assembly from which sonic signals are emitted toward a surface. In this manner, calibration of a surface type detection sensor 150 may be performed at any time or location by device 100 by moving a sample surface 203 into the path of emitted sonic signals.

Device 100 may engage, disengage, deploy, redeploy, adjust the height, adjust the speed, or make other adjustments of a surface treatment item 304 based all or in part upon a surface type detection performed using surface type detection sensor 150. For example, in response to such detection of the type of floor (e.g., hard floor or soft floor), or any other characteristics of the floor, device 100 may take one or more actions to adjust an aspect of the operation of the device 100. By way of example and not of limitation, in various embodiments device 100, or a portion thereof may: adjust a speed of movement of device 100; regulate a drive motor of device 100; moderate an amount of slip or spin permitted for a drive wheel of device 100; adjust or otherwise the speed of a suction motor of device 100 or otherwise moderate suction of a surface treatment item; adjust a height of a suction surface treatment item and/or suction opening with respect to a surface (e.g., surface 300); adjust a height of a rotary surface treatment item (e.g., a roller brush) or other surface treatment item of device 100 with respect to a surface; adjust a speed of rotation of a rotary surface treatment item of device 100; activate a rotary surface treatment item of device 100; deactivate a rotary surface treatment item of device 100; employ a liquid/spray cleaner tool of device 100; activate a brush tool of device 100; deactivate a brush tool of device 100; cease employment of a liquid/spray cleaner tool of device 100; employ a mop/wiping tool of device 100; cease deployment of a mop/wiping tool of device 100; employ a polishing tool of device 100; cease deployment of a polishing tool of device 100; activate an alarm or signal (audible, visible, or some combination) of or associated with device 100; and/or deactivate an alarm or signal of or associated with device 100. These and other actions may be performed by device 100 via instruction provided from a processor to: a surface treatment controller 180, to a drive wheel controller 170; and/or to other component(s) of device 100.

In some embodiments, surface detection and/or surface type detection may facilitate or assist in detecting whether a device is level, unlevel, stuck, or operating without one of its wheels/surface contact points in contact with a surface. For example, if device 100 moves partially past a drop off, such as over the edge of a stair or the edge of a roof, surface type detection sensor 150 may not be able to detect a surface or a surface type due to a surface being out of range or in the case of becoming stuck or unlevel may detect that a surface has dropped away substantially or gotten substantially closer since a previous measurement. Appropriate action may be initiated by device 100 to remedy a situation in which device 100 is detected to be unlevel, stuck, or operating without one of its wheels/surface contact points in contact with a surface.

Although FIGS. 3A-3C shows only a surface type detection sensor assembly 350, it may include a plurality of transducers/emitters, which may operate at different frequencies. The nature of a surface type may influence different frequencies in a different way, and therefore, using multiple frequencies may facilitate more accurate detection/determination of the surface type.

Example Surface Type Detection Sensor Assembly

Figure 4A:
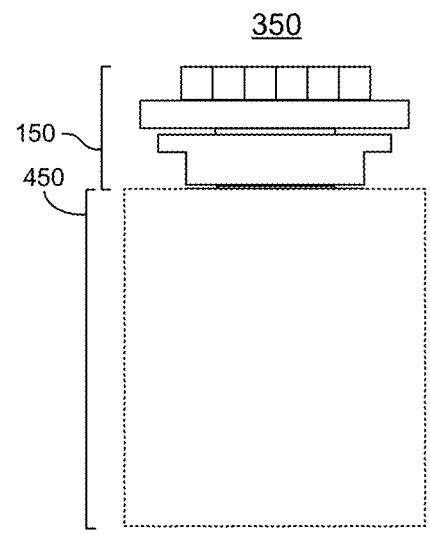
FIG. 4A illustrates a side elevational view of one example of a surface type detection sensor assembly which may be utilized on a device to emit sonic signals and receive returned sonic signals, in accordance with various embodiments.

FIG. 4A illustrates a side elevational view of one example of a surface type detection sensor assembly 350 which may be utilized on a device 100 to emit sonic signals and receive returned sonic signals, in accordance with various embodiments. Surface type detection sensor assembly 350 includes at least a surface type detection sensor 150. In some embodiments of surface type detection sensor assembly 350 a housing 450 (shown in dotted line), which encloses and/or defines an acoustic interface such as a tube, cavity, horn, or some combination thereof, may be included and coupled with surface type detection sensor 150. In other embodiments, surface type detection sensor assembly 350 includes surface type detection sensor 150 but not housing 450. In some embodiments, the surface type detection sensor assembly 350 is coupled with a device housing 201 (or other portion of device 100) such that it emits the sonic signals in a direction toward which a surface is expected to be encountered or operated upon (e.g., downward toward a floor surface, laterally toward where a wall or object may intercept the path of travel of device 100, etc.). For example, in a floor vacuum or robotic floor cleaning embodiment of device 100, a surface type detection sensor assembly 350 may be disposed on or configured to sense outward from the bottom of device 100, for example in the manner illustrated in FIG. 3A, such that emitted sonic signals are directed toward a floor surface 300 when device 100 is in operation. Similarly, in a flying drone embodiment (not depicted) of device 100 sonic signals may be emitted in the direction of a surface upon which the drone may land. As described in FIGS. 1A and 1B surface type detection sensor 150 may also be coupled with a host processor 110 or a sensor processor, in some embodiments, either or both of which operate to process and make determinations based upon received returned signals.

Figure 4B:
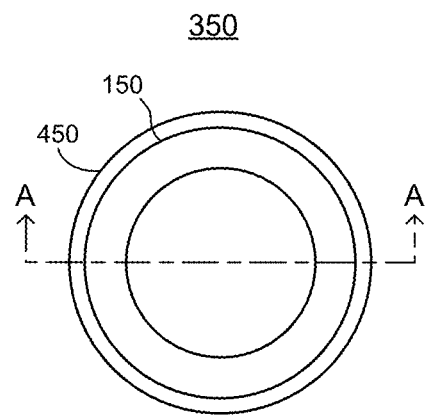
FIG. 4B illustrates a top view of the surface type detection sensor assembly of FIG. 4A, in accordance with various embodiments.

FIG. 4B illustrates a top view of the surface type detection sensor assembly 350 of FIG. 4A, in accordance with various embodiments. Section line A-A marks the location and orientation associated with sectional views illustrated in FIGS. 4C, 4D, and 4E.

Though not illustrated, the techniques discussed herein may also be used with separate sonic transmitter and receiver modules. Thus, in some embodiments, one version of surface type detection sensor assembly 350 may be a transmitter/emitter and another version may be a receiver and they may be used together to emit sonic signals and receive returned signals.

Figure 4C:
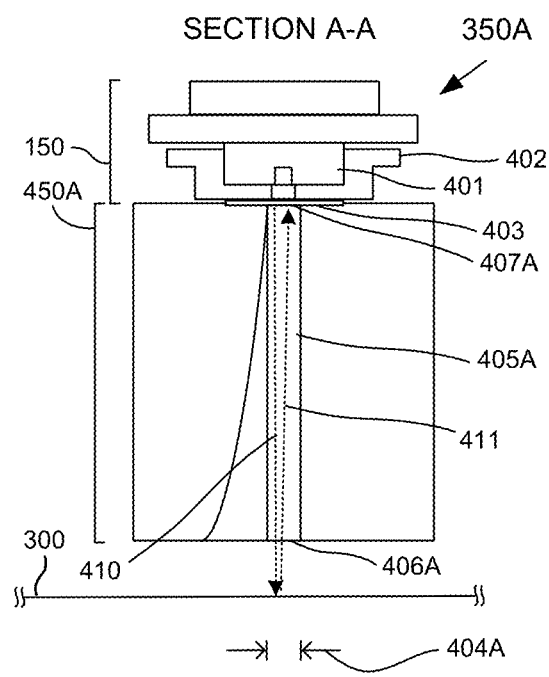
FIG. 4C illustrates a side sectional view of a configuration of a surface type detection sensor assembly, according to some embodiments.

FIG. 4C illustrates a side sectional view of a configuration of a surface type detection sensor assembly 350A, according to some embodiments. As can be seen, surface type detection sensor 150 includes a sonic transducer 401 (e.g., an ultrasonic transducer), which is covered by a cap 402 and separated from housing 450A by a membrane 403. Housing 450A encloses and/or defines an acoustic interface tube 405A (also referred to as an "acoustic tube" or simply "tube"). Acoustic tube 405A facilitates the travel of sonic signals, with a direction of travel represented by directional arrow 410, emitted from surface type detection sensor 150 into opening 407A of the acoustic interface tube 405A, through the length of acoustic interface tube 405A, and out of opening 406A toward surface 300. Acoustic tube 405A similarly facilitates the travel of sonic signals, with a direction of travel represented by directional arrow 411, returned from surface 300 into opening 406A of the acoustic interface tube 405A, through the length of acoustic interface tube 405A, and out of opening 407A to be received by surface type detection sensor 150. Dimensions of acoustic interface tube 405A are selected to limit an acoustic field of view of the surface type detection sensor 150 to provide greater attenuation of secondary returned signals from a soft surface than from a hard surface.

Figure 4D:
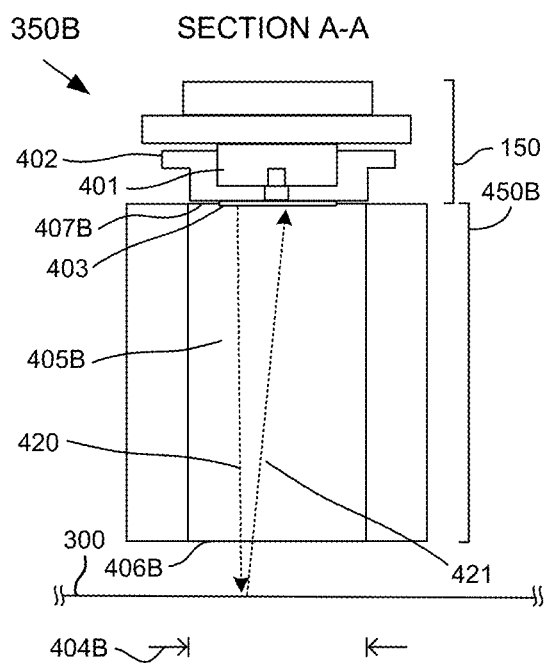
FIG. 4D illustrates a side sectional view of a configuration of a surface type detection sensor assembly, according to some embodiments.

FIG. 4D illustrates a side sectional view of a configuration of a surface type detection sensor assembly 350B, according to some embodiments. As can be seen, surface type detection sensor 150 includes a sonic transducer 401 (e.g., an ultrasonic transducer), which is covered by a cap 402 and separated from housing 450B by a membrane 403. Housing 450B encloses and/or defines an acoustic interface cavity 405B (also referred to as a "cavity" or "acoustic cavity"). Acoustic interface cavity 405B facilitates the travel of sonic signals, with a direction of travel represented by directional arrow 420, emitted from surface type detection sensor 150 into opening 407B of the acoustic interface cavity 405B, through the length of cavity 405B, and out of opening 406B toward surface 300. Acoustic interface cavity 405B similarly facilitates the travel of sonic returned signals, with a direction of travel represented by directional arrow 421, returned from surface 300 into opening 406B of the cavity 405B, through the length of cavity 405B, and out of opening 407B to be received by surface type detection sensor 150.

Figure 4E:
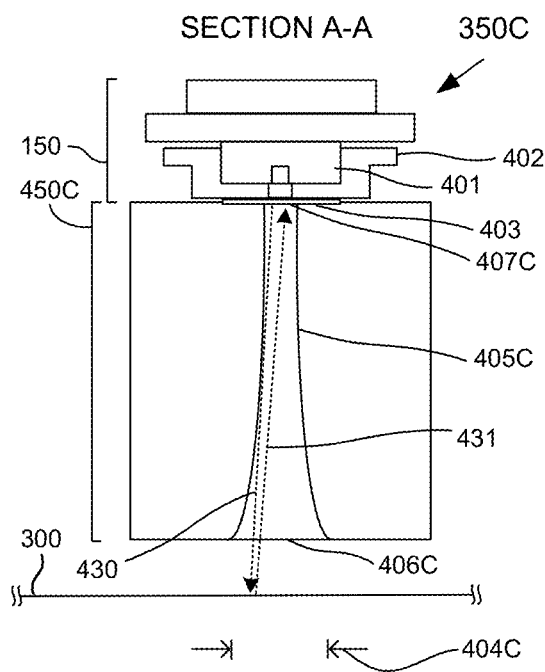
FIG. 4E illustrates a side sectional view of a configuration of a surface type detection sensor assembly, according to some embodiments.

FIG. 4E illustrates a side sectional view of a configuration of a surface type detection sensor assembly 350C, according to some embodiments. As can be seen, surface type detection sensor 150 includes a sonic transducer 401 (e.g., an ultrasonic transducer), which is covered by a cap 402 and separated from housing 450C by a membrane 403. Housing 450C encloses and/or defines an acoustic interface horn 405C (also referred to as an "acoustic horn" or "horn"). Acoustic interface horn 405C facilitates the travel of sonic signals, with a direction of travel represented by directional arrow 430, emitted from surface type detection sensor 150 into opening 407C of the acoustic interface horn 405C, through the length of horn 405C, and out of opening 406B toward surface 300. Between opening 407C and opening 406C, horn 405C is depicted as having a gradually increasing bell shape, like the shape of the bell of a trumpet, and may facilitate matching the acoustic impedance of a frequency of sound emitted from surface type detection sensor 150 to that of the environment into which the sound is emitted. The depicted bell shape is merely an example, and other horns or shapes which provide similar functionality may be used. Acoustic interface horn 405C similarly facilitates the travel of sonic returned signals, with a direction of travel represented by directional arrow 431, returned from surface 300 into opening 406C of the horn 405C, through the length of horn 405C, and out of opening 407C to be received by surface type detection sensor 150.

With reference to FIGS. 4C, 4D, and 4E, the configuration shown in FIG. 4C utilizes an acoustic interface tube 405A with a diameter 404A which is much smaller than the diameter 404B of the acoustic interface cavity 405B depicted in configuration shown in FIG. 4D. Otherwise the configurations are the same. It should be appreciated that the dimensions shown in the FIGS. 4C, 4D, and 4E are for example only, and any suitable dimensions may be used in accordance with the techniques described herein. However, it should also be appreciated that by making the diameter 404A of tube 405A smaller than the diameter 404B of cavity 405B, the proportion of secondary returned signals making it back to transducer 401 is greatly reduced. This reduction is because the secondary returned signals are multipath reflected and the narrower diameter 404A of opening 406A greatly reduces the chance that a multipath reflected signal will be reflected back through opening 406A. Referring to FIG. 4E, the diameter 404C of opening 406C may be wider like opening 406B or narrower like opening 406A (in order to reduce the proportion of secondary return signals), with the dimensions selected based on the attenuation of secondary signals desired.

In one example embodiment, the received returned signals are digitized. The digitization may be performed by a DSP on board surface type detection sensor 150, by a sensor processor 130, by a host processor 110, or by another processor. A time window of these digitized signals is selectively processed (such as by summing) to create a "reflectivity metric." This processing may be performed all or in part by a DSP on board surface type detection sensor 150, by a sensor processor 130, by a host processor 110, or by another processor. The time window may be selected to increase the proportion of secondary returned signals used in the processing. This may involve selecting the time window to include some secondary returned signals, mostly secondary returned signals, or all secondary returned signals with no direct returned signals. Transducer 401 is coupled to the environment through some kind of acoustic interface (e.g., a horn or a tube acting as a Helmholtz resonator) and is mounted some distance above the surface 300 to be detected and distinguished. Thus, the selection of the starting position of the window in time and the length of the window in time is also dependent on the acoustic interface as well as the distance from the transducer to the surface 300 (e.g., a floor).

The reflectivity metric may then be used to detect and distinguish whether the processed returned signals were reflected from a hard surface or a soft surface. This detecting and distinguishing may involve comparison to one or more threshold values. In some embodiments, the threshold(s) may be predefined and use to distinguish between different surface types. In some embodiments, the threshold(s) may also be set and/or modified during runtime to adapt to changing environmental conditions, changes in the operation of components of device 100, or other reasons. For example, the threshold(s) may be set/adjusted to compensate for humidity or changes in humidity which impact the propagation of sound.

Figure 4F:
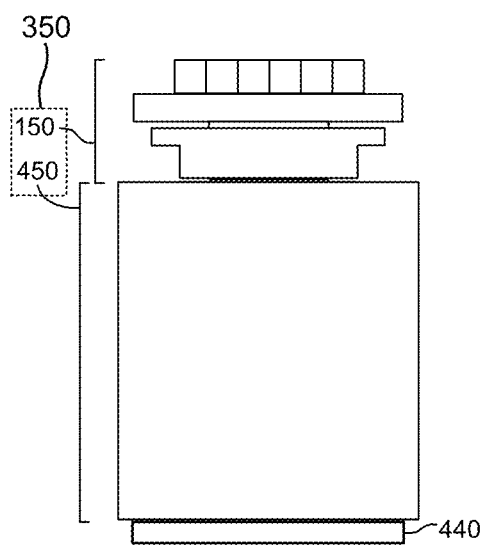
FIG. 4F illustrates a front elevational view of the surface type detection sensor assembly of FIGS. 4A and 4B with a protective covering, according to some embodiments.

FIG. 4F illustrates a front elevational view of the surface type detection sensor assembly of FIGS. 4A and 4B with a protective covering 440, according to some embodiments. Protective covering 440 allows the transmission of sonic signals through the protective covering 440 and also allows sonic returned signals to pass through the protective covering 440. Protective covering 440 may be fixed in place. Protective covering 440 may be utilized to improve aesthetics by covering what may otherwise be an exposed opening/hole 406 (see e.g., FIGS. 4C, 4D, and 4E). Protective covering 440 may also be utilized to impede the ingress of debris or particles of dust into surface type detection sensor assembly 350 via what may otherwise be an exposed opening/hole 406 (see e.g., FIGS. 4C, 4D, and 4E).

Figure 4G:
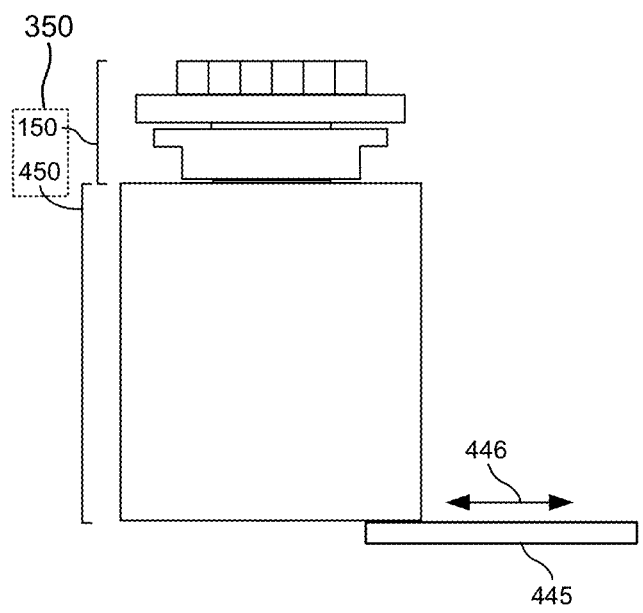
FIG. 4G illustrates a front elevational view of the surface type detection sensor assembly of FIGS. 4A and 4B with a removable protective covering, according to some embodiments.

FIG. 4G illustrates a front elevational view of the surface type detection sensor assembly of FIGS. 4A and 4B with a removable protective covering 445, according to some embodiments. In some embodiments, removable protective covering may not permit sonic signals to pass through, and thus is moved out of the way of sonic signals which are emitted by surface type detection sensor assembly 350 so that these sonic signals may be emitted toward a surface and may be reflected back as returned signals that are received by surface type detection sensor assembly 350. Directional arrows 446 illustrate how removable protective covering 445 slides laterally to or from the position occupied by protective covering 440 of FIG. 4F. When surface type detection sensor assembly 350 or device 100 is not in use, removable protective covering 445 may slide laterally on axis 446 to improve aesthetics by covering what may otherwise be an exposed opening/hole 406 (see e.g., FIGS. 4C, 4D, and 4E) and/or to impede the ingress of debris or particles of dust into surface type detection sensor assembly 350 via what may otherwise be an exposed opening/hole 406 (see e.g., FIGS. 4C, 4D, and 4E). In some embodiments, as previously described, one or more sample surfaces 203 may be incorporated into a removable protective covering 445 in FIG. 4G, which may be moved in place to cover a portion of surface type detection sensor assembly from which sonic signals are emitted toward the sample surface(s) 203. In this manner, calibration of a surface type detection sensor 150 may be performed at any time or location by device 100 by sliding a sample surface 203 into the path of emitted sonic signals.

In some embodiments, a reflection element, like a protrusion, may be disposed in tube/cavity/horn 405 or close to transducer 401. This reflection element may generate a constant reflection that is used as a reference. Because this reflection element is closer to transducer 401 than any exterior surface being detected, signals will from this reflection surface will return more quickly than signals returned from an exterior surface such as surface 300.

Figure 5:
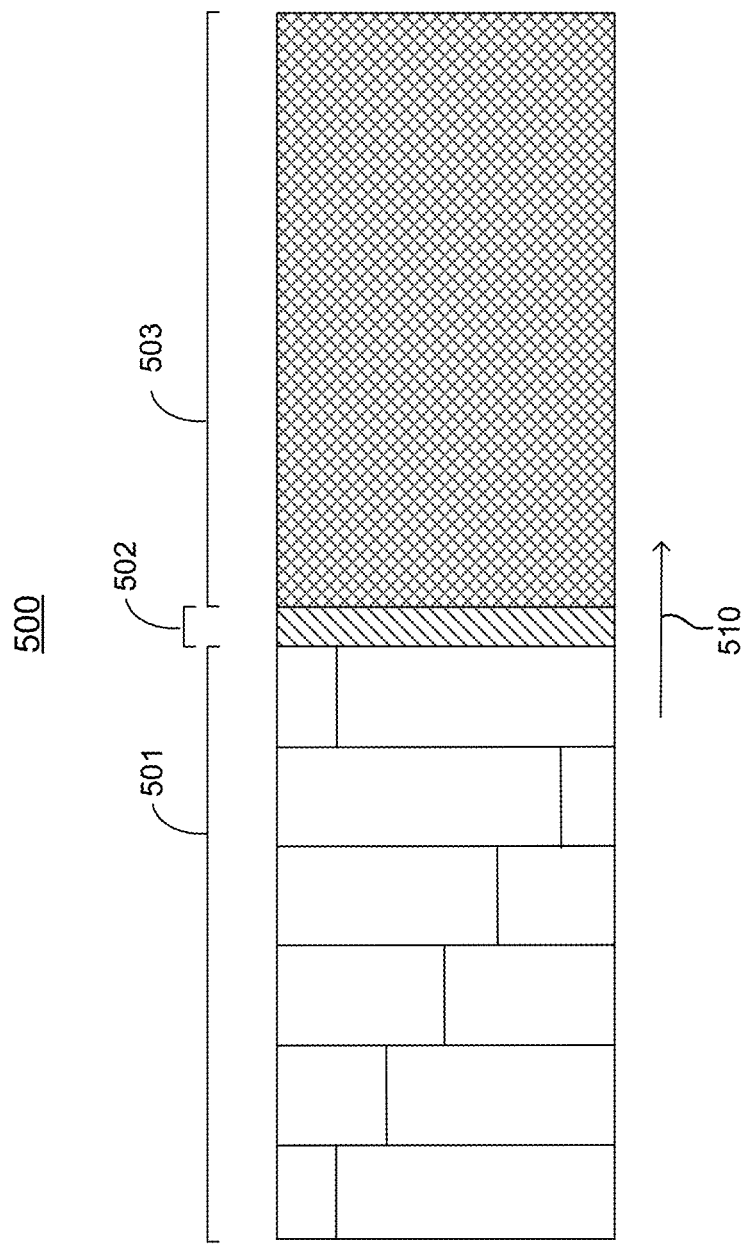
FIG. 5 shows top plan view of a test setup of floor materials with a hardwood floor separated by a metal trim transition from a carpeted floor, in accordance with various embodiments.

FIG. 5 shows top plan view of a test floor setup 500 of floor materials with a hardwood floor 501 separated by a metal trim 502 transition from a carpeted floor 503, in accordance with various embodiments. Arrow 510 shows a direction of travel from left to right with respect to test floor setup 500.

Figure 6A:
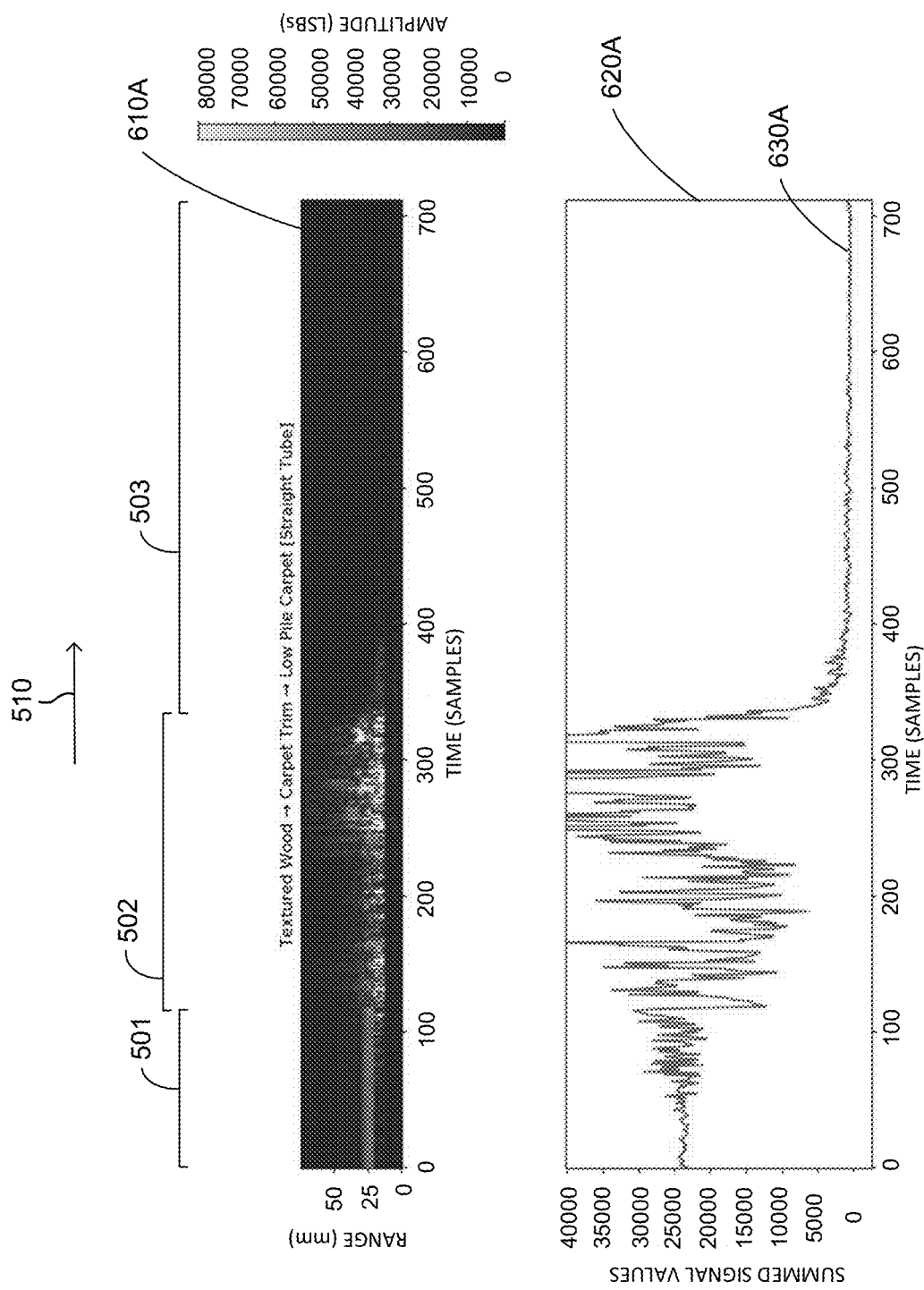
FIG. 6A shows example measurements of returned signals from the surface type detection sensor assembly of FIG. 4C as it moves across the test setup of floor materials of FIG. 5, according to some embodiments.

FIG. 6A shows example measurements of returned signals from the surface type detection sensor assembly 350A of FIG. 4C as it moves across the test setup 500 of floor materials of FIG. 5, according to some embodiments. Measurements made by a surface type detection sensor assembly 350A are made by emitting sonic signals for a period of time, ceasing emissions, and receiving returned signals while the emissions are ceased. In some embodiments, the sonic signals may be or include pulses which may be referred to as "chirps". In some embodiments, the sonic signals may be a continuous wave that may be received simultaneous with its transmission. After a certain period of time-of-flight, associated with a round trip between the transducer 401 and a reflecting surface, direct reflections will cease and received returned signals will be secondary returned signals which are multi-path returns that take a longer period of time to return. Arrow 510 shows the direction of movement, which is from left to right with respect to test setup 500. Graph 610A shows the digitized raw measurements of the returned signals. Graph 620A shows these raw measurements after some processing in which the discrete digitized amplitude signal values are summed and then the summation is graphed as line 630A. In some embodiments, the discrete digitized amplitude signal values which may be represented as the least significant bits (LSBs). LSBs are a commonly used and understood unit for analog-to-digital convertor (ADC) output and may also be referred to as "counts."

Figure 6B:
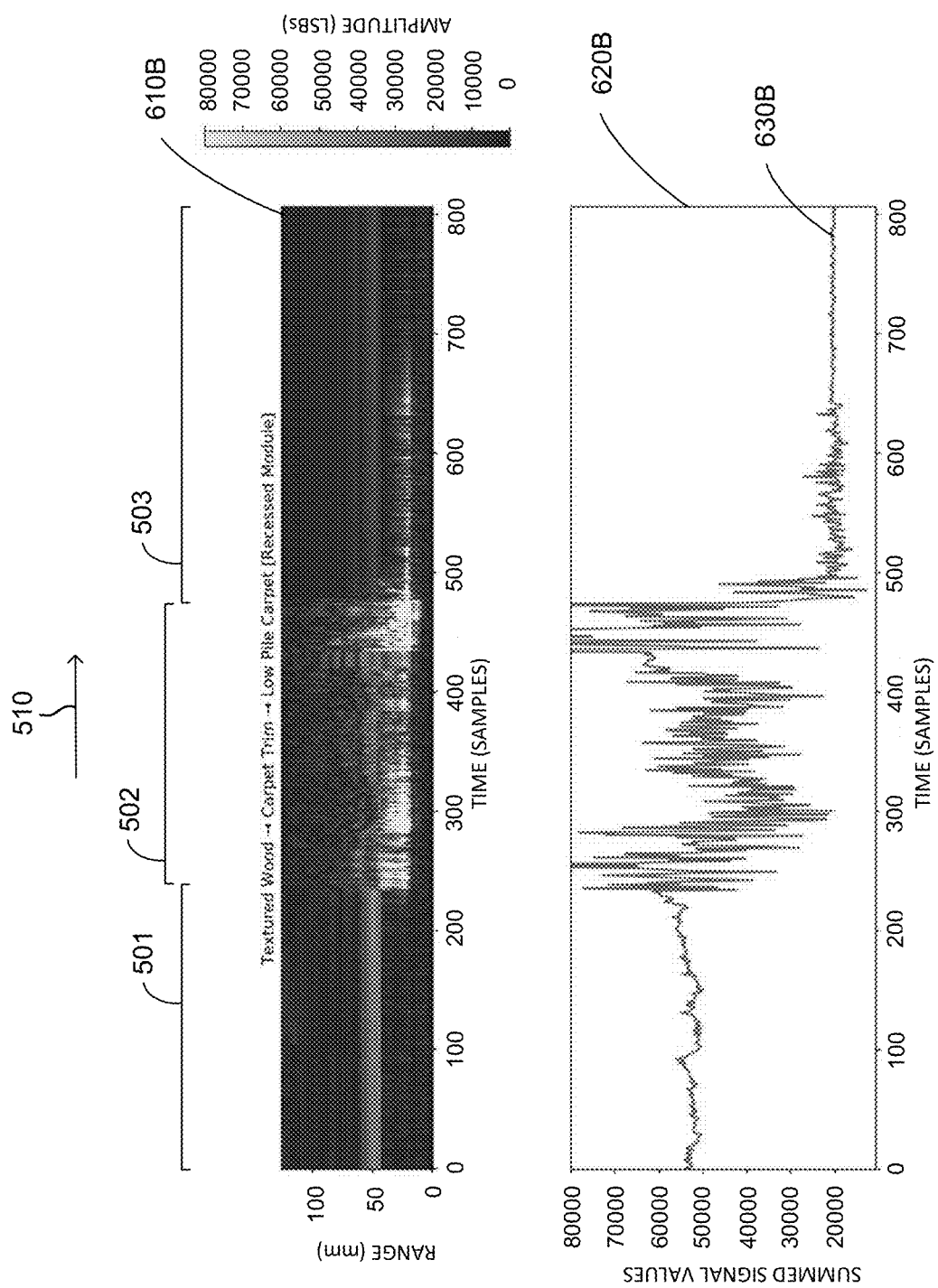
FIG. 6B shows example returned signals from the surface type detection sensor assembly of FIG. 4D as it moves across the test setup of floor materials of FIG. 5, according to some embodiments.

FIG. 6B shows example returned signals from the surface type detection sensor assembly 350B of FIG. 4D as it moves across the test setup 500 of floor materials of FIG. 5, according to some embodiments. Measurements made by a surface type detection sensor assembly 350B are made by emitting sonic signals for a period of time, ceasing emissions, and receiving returned signals while the emissions are ceased. After a certain period of time-of-flight, associated with a round trip between the transducer 401 and a reflecting surface, direct reflections will cease and received returned signals will be secondary returned signals which are multi-path returns that take a longer period of time to return. Arrow 510 shows a direction of travel from left to right with respect to test setup 500. Graph 610B shows the digitized raw measurements of the returned signals. Graph 620B shows these raw measurements after some processing in which the discrete digitized amplified signal values are summed and then the summation is graphed as line 630B. In some embodiments, the discrete digitized amplitude signal values which may be represented as the least significant bits of larger numbers.

As can be seen by comparing graphed lines 630A and 630B, in FIGS. 6A and 6B, the use of a smaller acoustic interface tube 405A provides improved performance the use of a larger cavity 405B by reducing (attenuating) the returned signals associated with a carpeted surface to very near zero by limiting the field of view of the surface type detection sensor assembly 350. Thus, the size of the diameter 404A of acoustic tube 405A may be selected to reduce returned signals from surfaces which would be considered "soft." In some embodiments, selection of the diameter 404A of acoustic tube 405A may involve acoustically matching or nearly acoustically matching the length and/or diameter of the tube to the transducer 401 to reduce impedance mismatch between the transducer 401 and the air through which a signal propagates and returns. In some embodiments, selection of the diameter 404A of acoustic tube 405A may involve experimentally determining a tube diameter which provides greater attenuation of certain secondary returned signals as compared to the attenuation of other returned signals. In some embodiments, selection of the diameter 404A of acoustic tube 405A may involve selecting a diameter 404A of acoustic tube 405A that is a ratio of the typical distance between the outer opening of the tube and the top of a surface to be detected. In some embodiments, this ratio is 1 to 10 (i.e., the diameter of the tube is 1 mm and the distance from the outer opening of the tube to the expected top of a surface being detected is 10 mm). In some embodiments, the diameter 404A of acoustic tube 405A may be selected to be in between some range of these ratios such as between 1:20 and 2:5. In some embodiments, acoustic tube diameter selection may involve selecting a tube diameter that is within a range of some multiples of the diameter size of cap 402 (e.g., between 2 times and 4 times the diameter of the cap 402 or between 0.25 and 0.75 times the diameter of the cap 402).

Selection of a Window of Time for Processing Returned Signals

The selection of the type of returned signals to process for surface type detection is accomplished, in some embodiments, by selecting a time window/range, after transmission of a sonic signal at a subjacent surface 300, such as a floor. In some embodiments, the selection of the window of time to process filters out some, the majority, or all of the primary returned signals that are received at a surface type detection sensor 150 in favor of capturing the later received secondary returned signals. One reason for this favoring of returned secondary signals in these techniques is that some returned primary signals are missed during the ringdown period, another is that the returned secondary signals have been found to demonstrate a very pronounced difference (in comparison to the differences seen in returned primary signals) when detecting between soft and hard surfaces. Ringdown is short a period of time during which a transducer is settling after transmission of a signal and during which interference from the transmission vibrations may be induced in a signal received by the transducer. The returned signals received in the selected time window/range are then processed, such as by summation or integration, and the processed result may be compared to a previously processed result (to determine a change in surface type) and/or to one or more stored exemplars or threshold values. The stored values or exemplars may have been predetermined and perhaps stored at a factory or may have been determined operationally by device 100. Values to which comparisons are made may be stored in a look up table (LUT) or other data structure which may be in a memory such as host memory 111 and/or internal memory 140. The LUT may map floor type, floor condition (e.g., cleanness, dirtiness, wetness, dryness), and/or floor hardness to returned signal amplitude, returned signal summed amplitude, slope of a range of returned signal summed amplitudes, or some other metric that is achieved by processing of returned signals in the selected time range. For example, with respect to floors, if the intensity of the amplitude exceeds a comparison to a stored threshold value associated with a hard floor, then the floor-type that is detected may determine to be a hard floor; if not, then the floor-type detected is determined to be a soft floor. Such threshold values may be fixed or may change over time, change in response to operation of a device, and/or change in response to operating or environmental conditions. In some embodiments, with a plurality of greater than two classifications of surface types, a series of ranges may be used. Classification of the surface type may depend from a plurality of characteristics extracted from the returned signals (e.g., reflected ultrasonic signals, such as energy, angle, dispersion, etc.). Other sensor data may also be combined with the ultrasonic information to determine the surface type. For example, motion and/or vibration characteristics when moving may be measured using motion sensors, speed while moving may be moved by motion sensors, sound (apart from the returned signals) while moving may be measured by microphones, etc.

It should be appreciated that this technique which employs a larger proportion of secondary returned signals may be applied to detecting information about surfaces other than floors, including but not limited to: building exteriors, building roofs, windows, dirt, gravel, roads, fabric, roofing, trails, sidewalks, water (or other liquid), etc. It may be employed to detect and determine other information about a surface beyond a hard/soft categorization. Such other detected information may include, in some embodiments: detecting whether the surface is wet or dry and if the surface is wet then detecting a relative wetness of the surface (i.e., damp, wet sprayed, covered with liquid, etc.); detecting whether a surface is clean or dirty, and if dirty a relative dirtiness of the surface (i.e., light dust, some debris, heavy dirt and/or debris, etc.), how hard a hard surface is (on a relative scale of hardness); detecting how hard a hard surface is (on a relative scale of hardness); and detecting how soft a surface is (on a relative scale of softness). The detection may be based on the time-of-flight (ToF) of the reflected signal, the ratio of primary and secondary returned signal, pulse width modification compared to the transmitted pulses, or angular distribution of sound waves or sound wave energies.

With respect to the floor-type detection example, one reason for utilizing a larger proportion of secondary returned signals for the floor-type detection is that it has been observed that both hard floors and soft floors provide fairly strong (though slightly different) returns of primary signals; however, hard floors provide a strong return of secondary signals in comparison to a much lower return of secondary signals from a soft floor. Put differently, soft floors have been found to largely absorb sonic signals that do reflect directly toward a receiver (i.e., those signals that bounce around in a multi-path reflection are largely absorbed by soft surfaces). Thus, in comparison to using only or mostly primary returned signals, the difference in secondary returned signals is pronounced enough between hard floors and soft floors that it substantially eases and improves the discrimination between hard floors and soft floors by reducing noise and other undesired reflections that may be present along with primary signals. This pronounced difference can be seen by comparison of graphs 710A and 710B in FIGS. 7A and 7B, respectively.

Figure 7A:
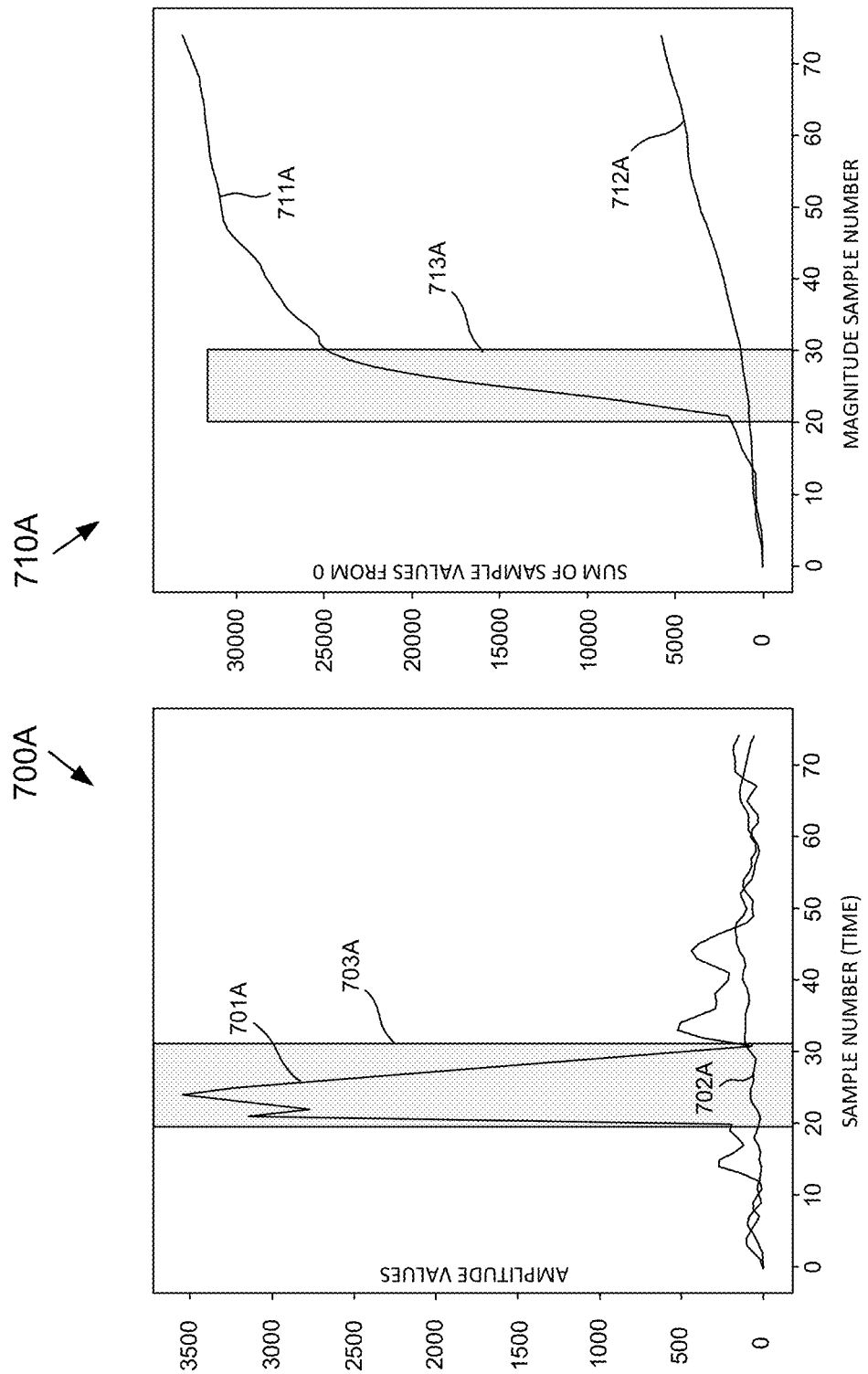
FIG. 7A shows graphs illustrating one example of how to select a processing window for the reflectivity metric for returns illustrated in FIG. 6A, according to some embodiments.

FIG. 7A shows graphs illustrating one example of how to select a processing window for the reflectivity metric for returns illustrated in FIG. 6A, according to some embodiments.

Figure 7B:
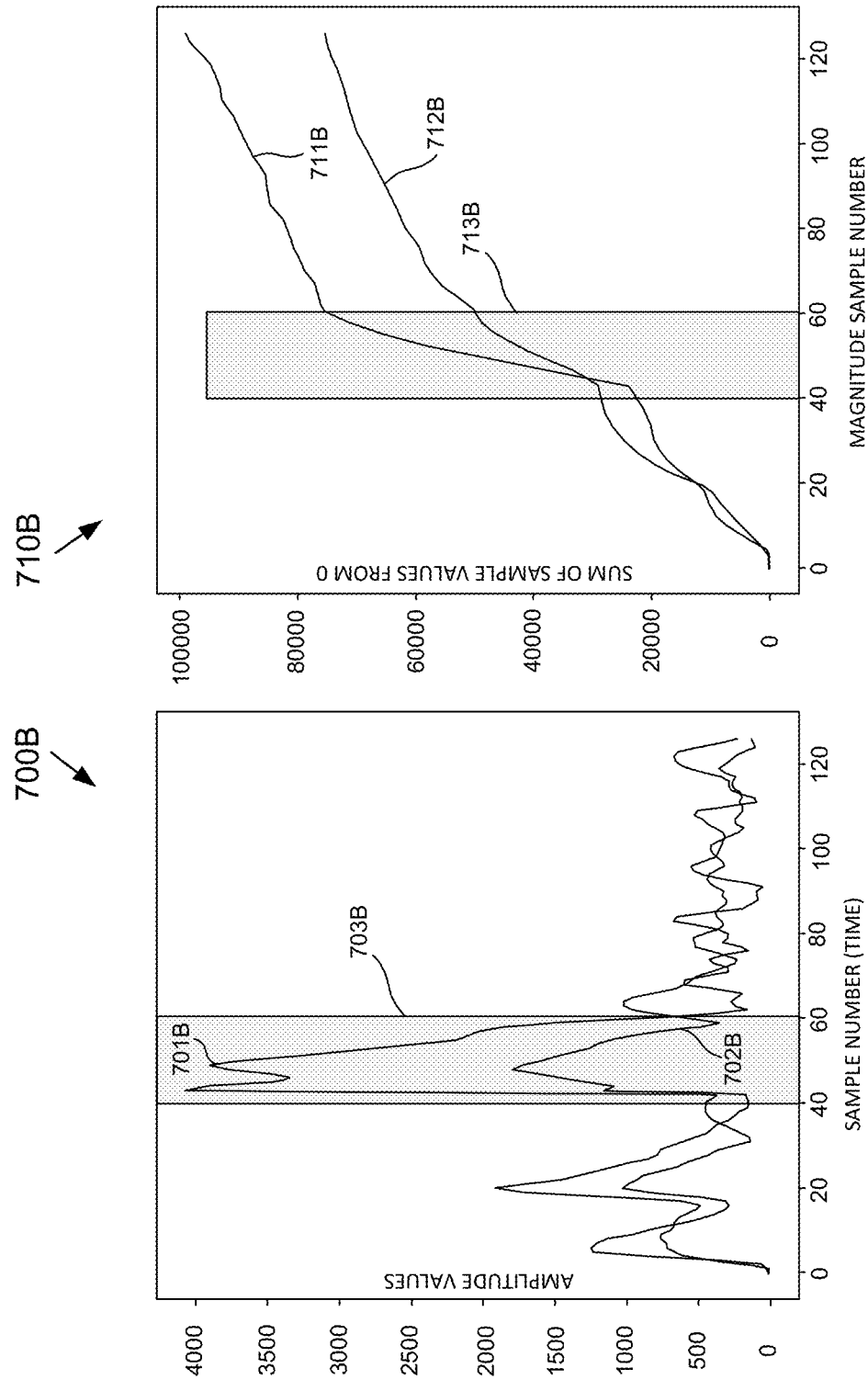
FIG. 7B shows graphs illustrating one example of how to select a processing window for the reflectivity metric for returns illustrated in FIG. 6B, according to some embodiments.

FIG. 7B shows graphs illustrating one example of how to select a processing window for the reflectivity metric for returns illustrated in FIG. 6B, according to some embodiments.

FIG. 7A shows graphs illustrating one example of how to select a processing window for the reflectivity metric for returns illustrated in FIG. 6A, according to some embodiments. The data in these graphs is collected using a surface type detection sensor assembly 350 with a narrow tube 405A which suppresses secondary returned signals. The x-axis in each of graph 700A and 710A is time-of-flight in milliseconds and data was collected at a 30 Hz sample rate. Graph 700A shows two magnitude traces 701A and 702A. Magnitude trace 701A is selected from signals returned when robotic cleaning appliance 100 was on a hard floor surface made of wood in the test floor setup 500 of FIG. 5. Magnitude trace 702A is from signals returned when robotic cleaning appliance 100 was moving on a soft floor surface made of carpet in the test floor setup 500 of FIG. 5. Graph 710A shows the summation of all magnitude values in each trace of graph 700A up to that point. That is, trace 711A represents summations (i.e., a cumulative summation) of the magnitude values of trace 701A while trace 712A represents summations of the magnitude values of trace 702A. For example, the value at x=50 in trace 711A in graph 710A is the sum of each point on the magnitude trace 701A from 0 to 50. The summation window 703A for magnitudes used for processing the reflectivity metric is chosen for a time-of-flight window between 20 ms and 30 ms, where the window of maximum change occurred in the returned signals. This time-of-flight window begins after the return of most or all primary returned signals, and can be selected in to encompass a time-of-flight window which would exclude all primary returned signals. The summed values for the reflectivity metrics appear in window 713A of graph 710A. Note that summed values associated with a hard surface (trace 711A in window 713A) have a steep upward slope and a high amplitude which ranges from about 2500 to 25000 in the time-of-flight window, while summed values associated with a soft surface (trace 712A in window 713A) have a relatively flat and only slightly upward slope which remains very close to zero amplitude and certainly far less than 2500 amplitude. In one embodiment, a reflectivity metric for a hard surface would represent the approximate slope and magnitude range or summation of values of trace 711A in time-of-flight window 713A, while a reflectivity metric for a soft surface would represent the approximate slope and magnitude range or summation of values of trace 712A in time-of-flight window 713A. Put another way, the difference between the slopes of trace 711A and trace 712A can be used to determine where the window 713A should be placed in FIG. 7A, and, from there, what the hard/soft threshold value should be. The reflectivity metric from a given sample/trace would be compared against the threshold value. With reference to the [20:30] time window, 711A has a significantly larger slope than 712A, meaning that the reflectivity metric you get from summing over that window will be higher for a hard surface (i.e., 711A) than it will be for a soft surface (i.e., 712A).

FIG. 7B shows graphs illustrating one example of how to select a processing window for the reflectivity metric for returns illustrated in FIG. 6B, according to some embodiments. The data in these graphs is collected using a surface type detection sensor assembly 350 with a wide cavity 405B which is not configured to suppress secondary returned signals. The x-axis in each of graph 700B and 710B is time-of-flight in milliseconds and data was collected at a 30 Hz sample rate. Graph 700B shows two magnitude traces 701B and 702B. Magnitude trace 701B is selected from signals returned when robotic cleaning appliance 100 was on a hard floor surface made of wood in the test floor setup 500 of FIG. 5. Magnitude trace 702B is from signals returned when robotic cleaning appliance 100 was moving on a soft floor surface made of carpet in the test floor setup 500 of FIG. 5. Graph 710B shows the summation of all magnitude values in each trace of graph 700B up to that point. That is, trace 711B represents summations (i.e., a cumulative summation) of the magnitude values of trace 701B while trace 712B represents summations of the magnitude values of trace 702B. For example, the value at x=50 in trace 711B in graph 710B is the sum of each point on the magnitude trace 701B from 0 to 50. The summation window 703B for magnitudes used for processing the reflectivity metric is chosen for a time-of-flight window between 40 ms and 60 ms, where the window of maximum change occurred in the returned signals. This time-of-flight window begins after the return of most or all primary returned signals, and can be selected to encompass a time-of-flight window which would exclude all primary returned signals. The summed values for the reflectivity metrics appear in window 713B of graph 710B. Note that summed values associated with a hard surface (trace 711B in window 713B) have a steep upward slope and a high amplitude which ranges from about 25000 to 75000 in the time-of-flight window 713B, while summed values associated with a soft surface (trace 712B in window 713B) have a less steep upward slope which ranges in amplitude between about 30000 and 50000. In one embodiment, a reflectivity metric for a hard surface would represent the approximate slope and magnitude range or summation of values of trace 711B in time-of-flight window 713B, while a reflectivity metric for a soft surface would represent the approximate slope and magnitude range or summation of values of trace 712B in time-of-flight window 713B. Put another way, the difference between the slopes of trace 711B and trace 712B can be used to determine where the window 713B should be placed in FIG. 7B, and, from there, what the hard/soft threshold value should be. The reflectivity metric from a given sample/trace would be compared against the threshold value. With reference to the [40:60] time window, 711B has a significantly larger slope than 712B, meaning that the reflectivity metric you get from summing over that window will be higher for a hard surface (i.e., 711B) than it will be for a soft surface (i.e., 712B). Looking at traces 711B and 712B makes this easier to understand, because, while the sum of 712B is higher than 711B from 0 to ~42, the sharp slope change of 711B in window 713B contributes the most to the overall difference of sums between traces 711B and 712B.

With reference to the discussion of FIGS. 7A and 7B, in some embodiments, more than time window may be utilized for evaluating received returned signals, and the reflectivity metric may be obtained from a comparison of values of the received returned signals in multiple windows of time which may be distinct (i.e., non-overlapping) or partially overlap. For example, in some embodiments, a first time window may be set to measure secondary returned signals that are second order and third order reflections and a second time window may be set to measure secondary returned signals that are fifth order and sixth order reflections. The measurements made for values in the first window (e.g., slope, magnitude, summation, average value) may be compared with measurements from the second window and the difference used to determine information about a surface (e.g., whether it is hard, soft, clean, dirty, wet, dry) and the degree of the information (e.g., how hard, how soft, how clean, how dirty, how wet, how dry). For example, the amount of drop in the summed value of a signal or the averaged value of a signal between the first time window and the second time window may be indicative of sensing a hard floor that is wet if the drop is within a first range or of a hard floor that is dry if the drop is within a second range. In general, the reflectivity matrix may be based on the decrease of signal as the order of the reflection increases. For example, the $2^{nd}$ order reflection will have a higher amplitude/energy than the $3^{rd}$ order reflection, and so on. This decrease of the signal with increasing order of reflection depends on the surface type, and as such may be used as a metric of reflectivity to determine the surface type. Therefore, by measuring the amplitude/energy of at least 2 different orders, the reflectivity can be determined and used to determine the surface type.

Information illustrated in FIGS. 7A and 7B reveals that the technique of choosing a time-of-flight window to exclude some, most, or all primary returned signals in favor of secondary returned signals results in reflectivity metrics which are different for soft and hard surfaces. A comparison of FIGS. 7A and 7B also shows that processing mostly or exclusively secondary returned signals while utilizing a narrow tube opening in a surface type detection sensor assembly 350, which has been selected to limit collection of secondary returned signals, results in a very dramatic difference in the reflectivity metrics for hard surfaces and soft surfaces. This dramatic difference in the hard and soft reflectivity metrics shown in FIG. 7A makes detection, via a comparison to these reflectivity metrics, of whether a surface type is hard or soft very easy differentiate.

In addition, in some embodiments, measurements made by a surface type detection sensor 150 (e.g., reflectivity metrics, presence or absence of a returned signal) may be combined with other types of sensor measurements to determine floor characteristics. For example, motion sensors may be used to characterize the motion of the device to determine if a floor or other surface being operated upon is smooth or causes vibrations (e.g., is bumpy). Additionally, the frequency spectrum, variation and or amplitude variation (variance) from motion sensors may be analyzed to determine a level of smoothness or vibration (e.g., bumpiness) associated with a surface. Since the motion of the device may be different depending on the surface type and structure, the motion data may be combined with the ultrasonic floor type determination to achieve a higher confidence detection of surface type. For example, on the spectrum of hard surfaces, a glass or concrete surface may be smoother than a wooden surface or tiled surface. In another example, on the spectrum of soft surfaces, a carpeted surface may be smoother than a surface covered by a braided area rug. In other embodiments, measurements made by a surface type detection sensor 150 may be combined with optical sensors to characterize a surface and facilitate greater accuracy in surface type detection.

Example Methods of Operation

Procedures of the methods illustrated by flow diagram 800 of FIGS. 8A-8E and flow diagram 900 of FIG. 9 will be described with reference to elements and/or components of one or more of FIGS. 1-7B. It is appreciated that in some embodiments, the procedures may be performed in a different order than described in a flow diagram, that some of the described procedures may not be performed, and/or that one or more additional procedures to those described may be performed. Flow diagrams 800 and 900 include some procedures that, in various embodiments, are carried out by one or more processors (e.g., processor 130, host processor 110, a DSP, or the like) under the control of computer-readable and computer-executable instructions that are stored on non-transitory computer-readable storage media (e.g., host memory 111, internal memory 140, or the like). It is further appreciated that one or more procedures described in flow diagram 800 and/or flow diagram 900 may be implemented in hardware, or a combination of hardware with firmware and/or software.

FIGS. 8A-8E illustrate a flow diagram of an example method of operation of a robotic cleaning appliance, in accordance with various embodiments. For purposes of example only, the device 100 of FIGS. 2-3C will be referenced as the robotic cleaning appliance. It may represent any type of robotic cleaning device such as a device that cleans by sweeping, wiping, mopping, polishing, or vacuuming a floor. However, it should be appreciated the robotic cleaning appliance may take other forms and have features and components other than those depicted and described. The robotic cleaning appliance comprises a housing 201, a surface type detection sensor 150 coupled with housing 201 or other portion of the robotic cleaning appliance, a surface treatment item 304 coupled with housing 201 or other portion of the robotic cleaning appliance, and a processor such as host processor 110 or sensor processor 130 which are disposed within and/or coupled with housing 201. In some embodiments, the surface type detection sensor 150 may be part of a larger assembly such as surface type detection sensor assembly 350 depicted in FIGS. 4A-4G. Surface type detection sensor 150 may be any suitable type of sonic sensor(s), to include a sonic transducer or a sonic emitter/transmitter paired with a separate and sonic receiver. Surface type detection sensor 150 may operate in any suitable portion of the sonic range and, in some embodiments, operates in the ultrasonic range (e.g., in the form of an ultrasonic transducer, or in the form of an ultrasonic emitter/transmitter and separate ultrasonic receiver). In some embodiments, where surface type detection sensor 150 operates in an ultrasonic range, it may operate in a range between 50 kHz and 500 kHz or in a range between 150 kHz and 200 kHz. Of course, other ultrasonic ranges are anticipated and usable.

In some embodiments, surface type detection sensor 150 is a floor type detection sensor which is generally used to detect the presence or absence of a floor 300 beneath robotic cleaning appliance 100 and further to collect returned signals from which the type of the floor (e.g., hard floor, soft floor, etc.) may be detected. In some embodiments, surface type detection sensor 150 is a wall type detection sensor which is generally used to detect the presence or absence of a wall laterally adjacent to robotic cleaning appliance 100 and further to collect returned signals from which the type of the floor (e.g., hard wall, soft wall, etc.) may be detected.

Figure 8A:
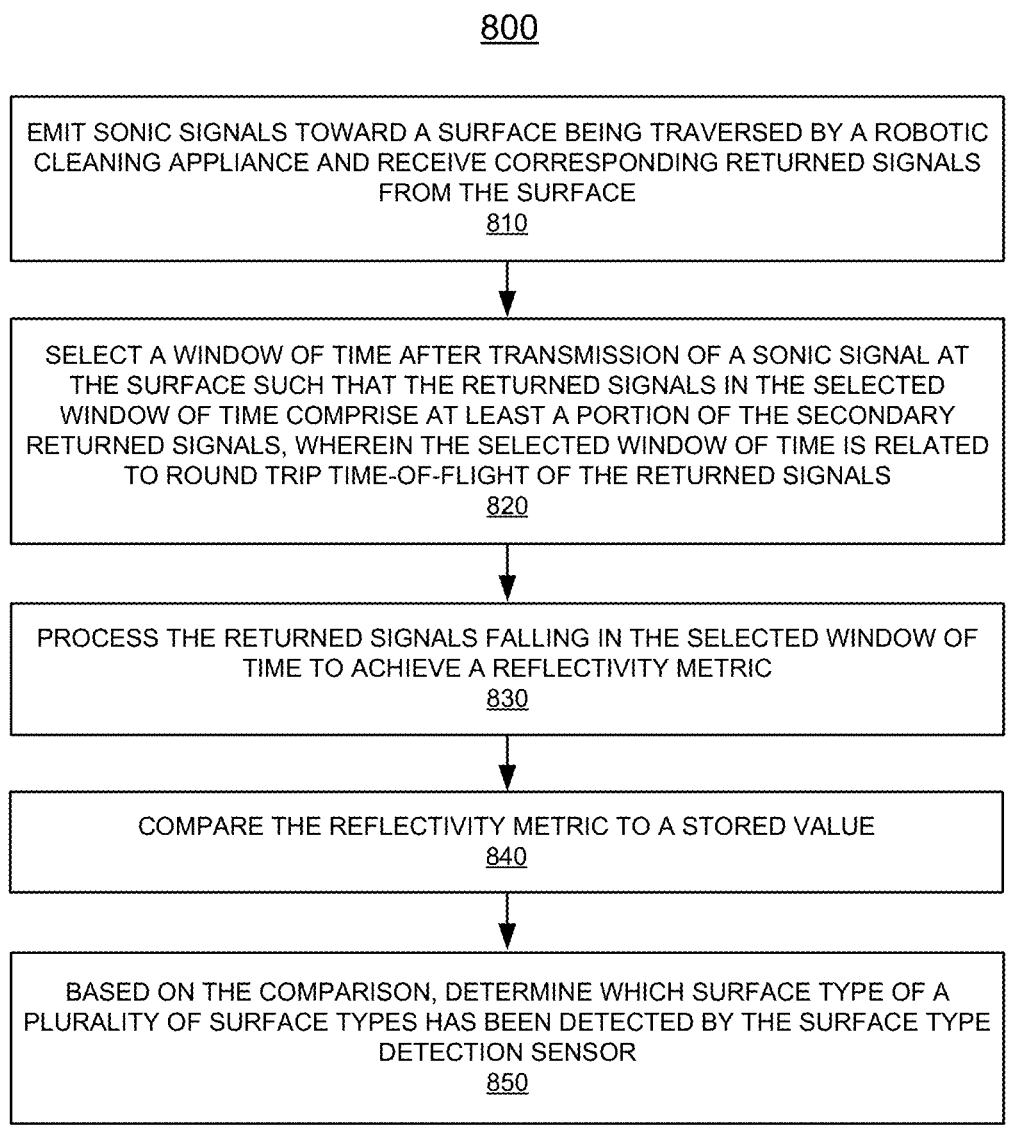
FIGS. 8A-8E illustrate a flow diagram of an example method of operation of a robotic cleaning appliance, in accordance with various embodiments.

With reference to FIG. 8A, at procedure 810 of flow diagram 800, in various embodiments, the surface type detection sensor 150 is operable to emit sonic signals toward a surface 300 being traversed by the robotic cleaning appliance 100 and receive corresponding returned signals from the surface 300. Host processor 110, sensor processor 130, and/or other suitable and available processor may the direct the emission of the sonic signals. The returned signals are used for surface type detection and include primary returned signals which are directly reflected and secondary returned signals which are multi-path reflected and return at a later time than the primary returned signals. Each returned signal has an amplitude which may be measured by surface type detection sensor 150 or a processor (e.g., host processor 110 and/or sensor processor 130) coupled with surface type detection sensor 150.

With continued reference to FIG. 8A, at procedure 820 of flow diagram 800, in various embodiments, a window of time after transmission of a sonic signal at the surface is selected such that the returned signals in the selected window of time comprise at least a portion of the secondary returned signals. Host processor 110, sensor processor 130, and/or other suitable and available processor may make the selection. Each of the returned signals has an amplitude which can be measured and digitally represented and processed. The selected window of time is related to round trip time-of-flight of the returned signals. This round trip time-of-flight is from their source of emission to an estimated location where the top of a surface 300 should be and then back to where the returned signals are received. For example, in one embodiment, a round trip distance may be 8 cm and selected window may be a range of time which occurs after some, most, or all direct returned signals would have completed this round trip distance. Of course, the round trip distance in a particular embodiment is dependent upon where a sensor 150 is mounted and the clearance between the sensor and the surface which is being measured. In this manner, the window of time may be selected such that the returned signals in the selected window of time comprise: some secondary returned signals; more secondary returned signals than primary returned signals; or even no primary returned signals. Similarly, the window of time may be selected to determine the nature of the secondary returned signals. For example, the window of time may be selected so that the secondary returned signal(s) are at least nth order reflected signals on the low end and a number large than n for the top end (e.g., where n is greater than or equal to 2 and less than or equal to 6, or where n is greater than or equal to 3 and less than or equal to 5, or some other suitable range). In another embodiment, the window of time may be selected so that it captures a particular order of reflections, i.e., third order but not second or fourth.

In some embodiments, the processor (110, 130) selects the window of time and an amount of primary signal versus an amount of secondary signal based on a ringdown time of the surface type detection sensor 150 and a round trip time-of-flight (ToF) of primary returned signals to the estimated location of a surface. For example, if the sensor is close to a surface such as the floor, the round trip time-of-flight of a primary returned signal may be very small, also detection of the reflected signal may be hindered or otherwise influenced by transducer ringdown. That is, even if the primary returned signal is very strong it may be overwhelmed by the interference caused by ringdown of the surface type detection sensor 150 (e.g., the acoustic emitter/transducer which may still be vibrating), making the primary returned signal difficult to distinguish from the ringdown signal. Thus, selecting a window of time after ringdown is complete will both eliminate interference from ringdown and also reduce or eliminate some or all primary returned signals.

In some embodiments, as illustrated in FIGS. 7A and 7B by windows of time 713A and 713B, the processor (110, 130) selects a window of time which includes at least a portion of a period of maximum change in the returned signals. That is, the window of time is selected to include a period with maximum upward slope of a graph of the summed amplitudes of returned signals.

With continued reference to FIG. 8A, at procedure 830 of flow diagram 800, in various embodiments, the returned signals falling in the selected window of time are processed to achieve a reflectivity metric. Host processor 110, sensor processor 130, and/or other suitable and available processor may perform the processing. The processing may include various types of summing, such as summing the discrete digitized amplitude signal values of a plurality of returned signals. In some embodiments, this may include summing the amplitudes of the returned signals falling in the selected window of time to achieve the reflectivity metric. In some embodiments, this may include summing the amplitudes of the returned signals up to and falling within the selected window of time to achieve the reflectivity metric. The reflectivity metric comprises one or more values that describe attributes of the measured returned signals in the window of time and which can be compared with a similar, stored value or values. In some embodiments, the reflectivity metric may comprise a slope or range of slopes which might include a threshold slope. In some embodiments, the reflectivity metric may include, but is not limited to: an amplitude, a range of amplitudes, a threshold amplitude, a summation of amplitudes in a window-of-time, an average amplitude (for example the summed amplitude in a window of time may be divided by the length of the window in milliseconds or some other units or by the number of sample periods in the length of the window), and/or a comparison of values in a first window of time for the received returned signals to like values in a second window of time for the received returned signals. In some embodiments, the processing may include demodulating the received returned signals to gain access to in-phase and quadrature data (called "IQ data" or "I/Q data") to gain access to phase or other information about the received returned signals. Accordingly, in some embodiments, the reflectivity metric may additionally or alternatively include phase information from the received returned signals; and decisions may be made all or in part based upon this phase information. Additionally, in some embodiments, the phase or other information may be used to create additional secondary, augmentative reflectivity metrics, which may, for purposes of example and not of limitation, be used to categorize a surface by its texture, wetness, or some other criteria. In some embodiments, this phase or other information may be calculated from the same time window as the primary reflectivity metric, in a time window overlapping the time window of the primary reflectivity metric, or a time window separate from that of the primary reflectivity metric.

With continued reference to FIG. 8A, at procedure 840 of flow diagram 800, in various embodiments, the reflectivity metric is compared to a stored value. Host processor 110, sensor processor 130, and/or other suitable and available processor may perform the comparison. The stored value may be one or more values of a stored reflectivity metric. Thus, the stored value may comprise a range, a threshold, or the like. The stored value may be a previously calculated reflectivity metric or value(s) obtained and stored while the robotic cleaning appliance is docked in a base station 202 or entering or departing a base station 202.

The stored value may comprise a value obtained by detecting a surface type of an exemplar/sample surface 203 coupled with one of the robotic cleaning appliance (e.g., removable protective covering 445) and a dock/base station 202 (e.g., sample surface 203) for the robotic cleaning appliance 100. The stored value may be a previously calculated reflectivity metric or value(s) obtained and stored while the robotic cleaning appliance is normally operating, and thus may be obtained from the previous detection of a surface 300 (e.g., a floor). For example, the stored value may be or include the previously calculated reflectivity metric; an average or mean of several recently calculated reflectivity metrics (e.g., the most recent 2, 3, 4, etc.); or an average or mean of reflectivity metrics calculated during a certain rearward looking time period (e.g., −0.5 seconds, −1 second, −2 seconds, −3 seconds, etc.). Changes overtime, when looking backwards, can act as a "change-of-surface-type detector" which detects changes from a hard surface to a soft surface, from a soft surface to a hard surface, from a wet surface to a dry surface, from a clean surface to a dirty surface, etc. By measuring speed and the time of occurrence of the change, a location of the change can be mapped to a location of device 100 when the change of surface type occurred.

With continued reference to FIG. 8A, at procedure 850 of flow diagram 800, in various embodiments, based on the comparison, it is determined which surface type of a plurality of surface types has been detected by the surface type detection sensor. Host processor 110, sensor processor 130, and/or other suitable and available processor may make the determination. In some embodiments, the determination is binary as being either a hard surface or a soft surface. For example a floor such as wooden, tile, or concrete floor would be associated with a reflectivity metric that would be determined to be a hard surface or hard floor, while a floor such as an area rug or carpet or doormat would be associated with a reflectivity metric that would be determined to be a soft surface or soft floor. In some embodiments, the determinations may not be limited to just two outcomes. For example, based on respective reflectivity metrics, a wooden floor may be determined to be a medium hard surface/floor, a concrete floor may be determined to be as a hard surface/floor, a low pile carpet may be determined to be a medium soft floor/surface, and a shag carpet may be determined to be a soft floor/surface.

Figure 8B:
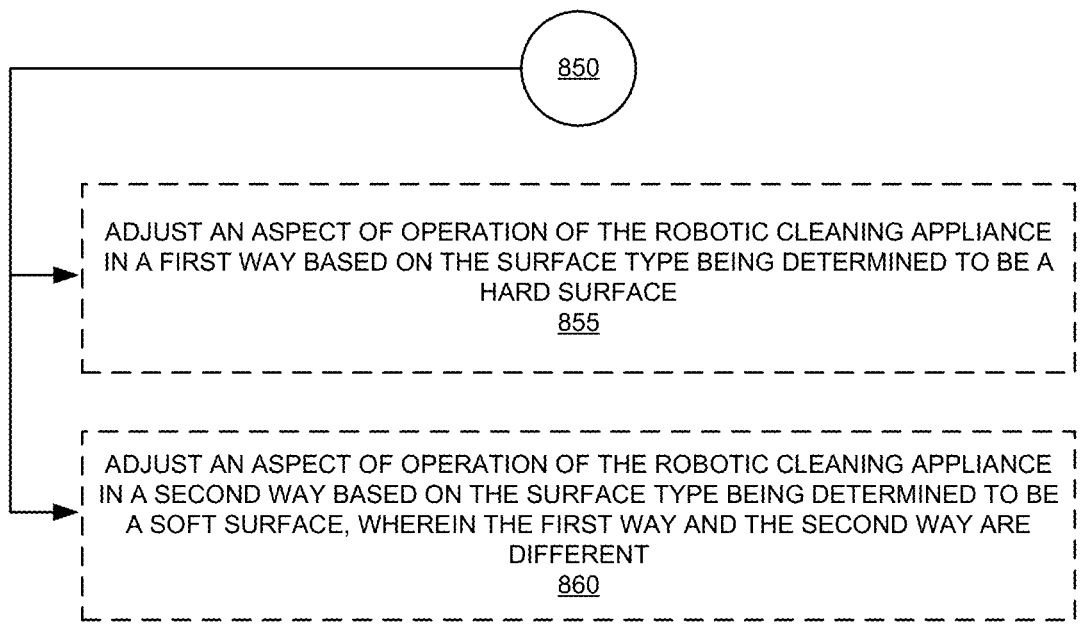

With reference to FIG. 8B, at procedure 855 of flow diagram 800, in various embodiments, the processor (e.g., host processor 110, sensor processor 130, or the like) operates to adjust an aspect of operation of the robotic cleaning appliance 100 in a first way based on the surface type being determined to be a hard surface. This first way may be speeding or slowing the traveling speed of the robotic cleaning appliance 100 with respect to the hard surface, changing the type of surface treatment item used, adjusting the speed of rotation or movement or height of a surface treatment item with respect to the hard surface, etc. For example, speed of robotic cleaning appliance 100 may be increased when operating on a hard surface as compared to when operating on a soft surface; suction may be adjusted to a setting associated with cleaning a hard surface; a surface treatment item associated with cleaning a hard surface may be employed; the speed of operation of a surface treatment item may be set to a speed associated with cleaning a hard surface; etc.

With reference to FIG. 8B, at procedure 860 of flow diagram 800, in various embodiments, the processor (e.g., host processor 110, sensor processor 130, or the like) operates to adjust an aspect of operation of the robotic cleaning appliance 100 in a second way based on the surface type being determined to be a soft surface. In some embodiments, the first way and second way are different. This second way may be speeding or slowing the traveling speed of the robotic cleaning appliance 100 with respect to the soft surface, changing the type of surface treatment item used, adjusting the speed of rotation or movement or height of a surface treatment item with respect to the soft surface, etc. For example, speed of robotic cleaning appliance 100 may be decreased when operating on a soft surface as compared to when operating on a hard surface; suction may be adjusted to a setting associated with cleaning a soft surface (which may comprise greater suction than used to clean a hard surface); a surface treatment item associated with cleaning a soft surface may be employed; the speed of operation of a surface treatment item may be set to a speed associated with cleaning a soft surface; etc.

Figure 8C:
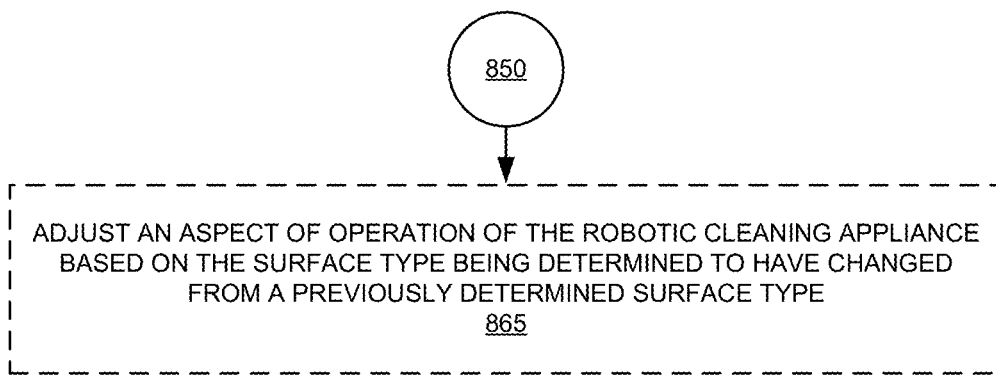

With reference to FIG. 8C, at procedure 865 of flow diagram 800, in various embodiments, the processor (e.g., host processor 110, sensor processor 130, or the like) operates to adjust an aspect of operation of the robotic cleaning appliance 100 based on the surface type being determined to have changed from a previously determined surface type. For example, a drive wheel controller 170 may be instructed to slow down when changing from a hard surface to a soft surface and to speed up when changing from a soft surface to a hard surface.

Figure 8D:
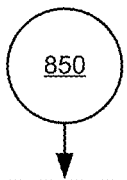

With reference to FIG. 8D, at procedure 870 of flow diagram 800, in various embodiments, the processor (e.g., host processor 110, sensor processor 130, or the like) operates to detect a malfunction of the robotic cleaning appliance 100 based on the reflectivity metric being determined to have changed beyond a threshold from a previously determined reflectivity metric. For example, such a beyond threshold change may indicate that an aspect of robotic cleaning appliance 100 is malfunctioning. Some examples of malfunctions include: an unexpected surface type; a faulty or dirty surface type detection sensor 150; and absence of a detectable surface due to tilt, upsetting of robotic cleaning appliance 100, or moving out beyond a drop off such as the edge of a stair step or roof; or other issue.

Figure 8E:
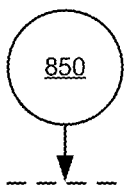

With reference to FIG. 8E, at procedure 875 of flow diagram 800, in various embodiments, robotic cleaning appliance 100 comprises a robotic floor cleaner and/or vacuum (RFCV) and a processor such as host processor 110 or sensor processor 130 operates to control or to trigger the RFCV, based on the determination of surface type, to take an action. Some non-limiting examples of examples may include: adjusting a speed of movement of the RFCV; regulating a drive motor of the RFCV; moderating an amount of slip or spin permitted for a drive wheel of the RFCV; adjusting a speed of a suction motor of the RFCV; adjusting a height of a suction surface treatment item/opening with respect to a floor surface; adjusting a height of a rotary surface treatment item (e.g., a roller brush) or other surface treatment item of the RFCV; adjusting a speed of rotation of a rotary surface treatment item of the RFCV; activating a rotary surface treatment item of the RFCV; deactivating a rotary surface treatment item of the RFCV; employing a spray cleaner tool of the RFCV; activate a brush tool of the RFCV; deactivating a brush tool of the RFCV; ceasing employment of a spray cleaner tool of the RFCV; employing a mop tool of the RFCV; ceasing deployment of a mop tool of the RFCV; activating an alarm or signal; and deactivating an alarm or signal. In some instances, controlling is done by host processor 110 and triggering (such as by sending a message or interrupt to host processor 110) may be accomplished by sensor processor 130.

Figure 9:
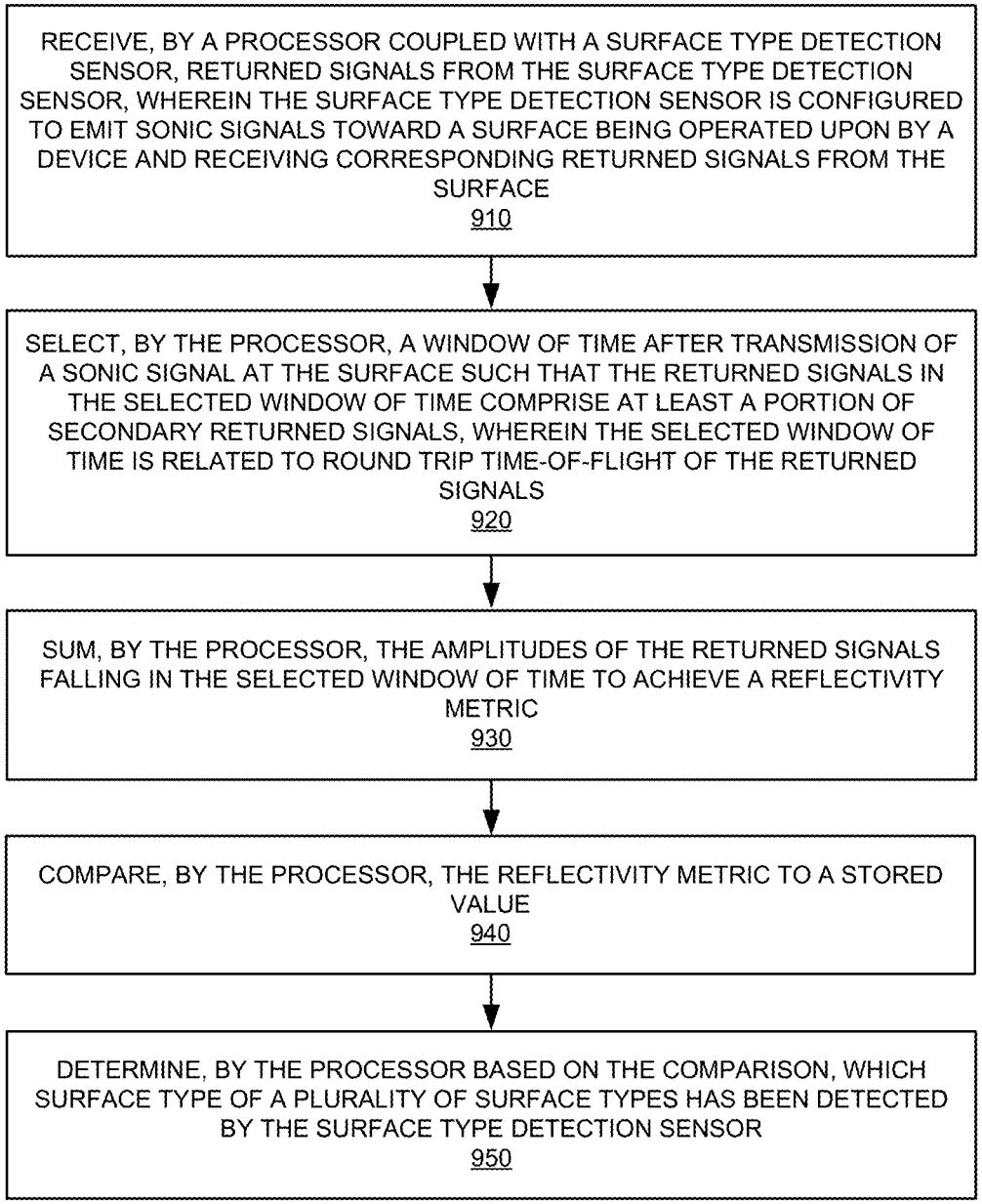
FIG. 9 illustrates a flow diagram of an example method of surface type detection, in accordance with various embodiments.

FIG. 9 illustrates a flow diagram 900 of an example method of surface type detection, in accordance with various embodiments. Procedures in flow diagram 900 may be performed by one or more components of a device 100 and/or sensor processing unit 120, such as host processor 110 and/or sensor processor 130.

With reference to FIG. 9, at procedure 910 of flow diagram 900, in various embodiments, a processor coupled with a surface type detection sensor 150 receives returned signals from the surface type detection sensor 150. The processor may be host processor 110, sensor processor 130, and/or another processor of the sensor processing unit 120 (e.g., a DSP associated with the surface type detection sensor 150) or device 100. The surface type detection sensor 150 operates to emit sonic signals toward a surface 300 being operated upon by a device 100 and receiving corresponding returned signals from the surface 300. The surface type detection sensor 150 may operate under instruction from one or processors. Each returned signal has an amplitude which may be measured by surface type detection sensor 150 or another processor (e.g., a DSP) coupled with surface type detection sensor 150. The returned signals are used for surface type detection and include primary returned signals which are directly reflected and secondary returned signals which are multi-path reflected and return at a later time than the primary returned signals (due to traveling a longer round trip path).

In some embodiments, the returned signals are initially received via an acoustic tube (such as acoustic tube 405A of FIG. 4C). For example, acoustic tube 405A is disposed with a first opening 407A of the tube 405A coupled to the surface type detection sensor 150. Tube 405A directs emitted sonic signals through the tube 405A and out of a second opening 406A toward a surface, such as surface 300. Returned signals enter through second opening 406A of tube 405A, travel through the tube 405A, and the out the first opening 407A of tube 405A to be received by surface type detection sensor 150 and then passed onward (in digitized version) to sensor processor 130. Dimensions such as the length and diameter of tube 405A are selected, in some embodiments, to limit an acoustic field of view of surface type detection sensor 150 in order to provide greater attenuation of secondary returned signals from a soft surface than from a hard surface. Put differently, a narrow aperture provided by second opening 406A makes it difficult for multi-path returned signals to enter tube 405A and thus acts as a mechanical filter for secondary returned signals.

With continued reference to FIG. 9, at procedure 920 of flow diagram 900, in various embodiments, a window of time is selected in a period after transmission of a sonic signal at the surface (e.g., surface 300). A processor makes the selection. The processor may be host processor 110, sensor processor 130, and/or another processor of the sensor processing unit 120 (e.g., a DSP associated with the surface type detection sensor 150) or device 100. The window of time is selected such that the returned signals in the selected window of time comprise at least a portion of secondary returned signals. Each of the returned signals has an amplitude which can be measured and digitally represented and processed. The selected window of time is related to round trip time-of-flight of the returned signals. This round trip time-of-flight is from their source of emission to an estimated location where the top of a surface 300 should be and then back to where the returned signals are received. For example, round trip distance may be 9 cm and selected window may be a range of time which occurs after some, most, or all direct returned signals would have completed this round trip distance. In this manner, the window of time may be selected such that the returned signals in the selected window of time comprise: some secondary returned signals; more secondary returned signals than primary returned signals; or even no primary returned signals. Similarly, the window of time may be selected to determine the nature of the secondary returned signals. For example, the window of time may be selected so that the secondary returned signals are at least nth order reflected signals on the low end and a number large than n for the top end (e.g., where n is greater than or equal to 1 and less than or equal to 5, or where n is greater than or equal to 1 and less than or equal to 5, or where n is greater than or equal to 3 and less than or equal to 7, or some other suitable range).

In some embodiments, the processor selects the window of time and an amount of primary signal versus an amount of secondary signal based on a ringdown time of the surface type detection sensor 150 and a round trip time-of-flight (ToF) of primary returned signals to the estimated location of a surface. For example, portions of primary returned signals that are received during ringdown of the surface type detection sensor 150 may be difficult to distinguish from interference caused by the ringdown of the surface type detection sensor 150. Thus, detection of the reflected signal may be hindered or otherwise influenced by transducer ringdown in surface type detection sensor 150. Thus, selecting a window of time after ringdown is complete will both eliminate interference from ringdown and also reduce or eliminate primary returned signals.

In some embodiments, the window of time may be preset (such as a factory setting) and the selection may involve the processor implementing this preset selection.

In some embodiments, as illustrated in FIGS. 7A and 7B by windows of time 713A and 713B, the processor selects a window of time which includes at least a portion of a period of maximum change in the returned signals. That is, the window of time is selected to include a period with maximum upward slope of a graph of the summed amplitudes of returned signals.

With continued reference to FIG. 9, at procedure 930 of flow diagram 900, in various embodiments, the amplitudes of the returned signals falling in the selected window of time are summed to achieve a reflectivity metric. The summing is performed by a processor. The processor may be host processor 110, sensor processor 130, and/or another processor of the sensor processing unit 120 (e.g., a DSP associated with the surface type detection sensor 150) or device 100, or by a processor on-board surface type detection sensor 150 (e.g., the summing may be done on-chip by or alongside electronics which operate an acoustic transducer or surface type detection sensor 150). Various types of summing may be involved, such as summing the discrete digitized amplitude signal values of a plurality of returned signals. In some embodiments, this may include summing the amplitudes of the returned signals falling in the selected window of time to achieve the reflectivity metric. In some embodiments, this may include summing the amplitudes of the returned signals up to and falling within the selected window of time to achieve the reflectivity metric. The reflectivity metric comprises one or more values that describe attributes of the measured returned signals in the window of time and which can be compared with a similar, stored value or values. In some embodiments, the reflectivity metric may comprise a slope or range of slopes which might include a threshold slope. In some embodiments, the reflectivity metric may additionally or alternatively include one or more of: an amplitude, a range of amplitudes, a threshold amplitude, and/or an average summed value over a window of time.

With continued reference to FIG. 9, at procedure 940 of flow diagram 900, in various embodiments, the reflectivity metric is compared to a stored value. The comparison is performed by a processor. The processor may be host processor 110, sensor processor 130, and/or another processor of the sensor processing unit 120 (e.g., a DSP associated with the surface type detection sensor 150) or device 100. The stored value may be one or more values of a stored reflectivity metric. Thus, the stored value may comprise a range, a threshold, or the like. In some embodiments, the stored value may be predetermined a predetermined value stored during manufacturing. In some embodiments, the stored value may be dynamic, such as a previously calculated reflectivity metric or value(s) obtained and stored while the robotic cleaning appliance is docked in a base station 202 or entering or departing a base station 202. For example, the stored value may comprise a value obtained by detecting a surface type of an exemplar/sample surface 203 coupled with one of the robotic cleaning appliance (e.g., removable protective covering 445) and a dock/base station 202 (e.g., sample surface 203) for the robotic cleaning appliance 100. In some embodiments, the stored value may be a previously calculated reflectivity metric or value(s) obtained and stored while the robotic cleaning appliance is normally operating, and thus may be obtained from the previous detection of a surface 300 (e.g., a floor). For example, the stored value may be or include the previously calculated reflectivity metric; an average or mean of several recently calculated reflectivity metrics (e.g., the most recent 2, 3, 4, etc.); or an average or mean of reflectivity metrics calculated during a certain rearward looking time period (e.g., −0.5 seconds, −1 second, −2 seconds, −3 seconds, etc.).

With continued reference to FIG. 9, at procedure 950 of flow diagram 900, in various embodiments, based on the comparison, it is determined which surface type of a plurality of surface types has been detected by the surface type detection sensor 150. The determination is made by a processor. The processor may be host processor 110, sensor processor 130, and/or another processor of the sensor processing unit 120 (e.g., a DSP associated with the surface type detection sensor 150) or device 100. In some embodiments, the determination is binary as either being a hard surface or a soft surface. For example a floor such as wooden, tile, or concrete floor would be associated with a reflectivity metric that would be determined to be a hard surface or hard floor, while a floor such as an area rug or carpet or door mat would be associated with a reflectivity metric that would be determined to be a soft surface or soft floor. In some embodiments, the determinations may not be limited to just two outcomes. For example, based on respective reflectivity metrics, a wooden floor may be determined to be a medium hard surface/floor, a concrete floor may be determined to be as a hard surface/floor, a low pile carpet may be determined to be a medium soft floor/surface, and a shag carpet may be determined to be a soft floor/surface. Additional detections, such as detecting transition regions (i.e., detecting borders between different surface types), edge detection (i.e., detecting the edge of surface or a drop-off from a surface), wetness detection, dryness detection, dirtiness detection, etc. may also be accomplished.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A robotic cleaning appliance comprising:
   a surface type detection sensor configured to emit sonic signals toward a surface being traversed by the robotic cleaning appliance and receive corresponding returned signals from the surface, wherein the returned signals are used for surface type detection, and wherein the returned signals include primary returned signals which are directly reflected and secondary returned signals which are multi-path reflected and return at a later time than the primary returned signals;
   a processor coupled with the surface type detection sensor and configured to:
      select a window of time after transmission of a sonic signal at the surface such that the returned signals falling in the selected window of time comprise at least a portion of the secondary returned signals, wherein the selected window of time is related to round trip time-of-flight of the returned signals, and wherein each of the returned signals has an amplitude;
      process the returned signals falling in the selected window of time to achieve a reflectivity metric;
      compare the reflectivity metric to a stored value; and
      based on the comparison, determine which surface type of a plurality of surface types has been detected by the surface type detection sensor.

2. The robotic cleaning appliance of claim 1, further comprising:
   a tube disposed with a first opening of the tube coupled to the surface type detection sensor and a second opening of the tube providing an acoustic path to an environment external surface type detection sensor, wherein the tube is configured to direct the emitted sonic signals through the tube and out of the second opening toward the surface and to direct returned signals from the surface through the second opening of the tube and back to the surface type detection sensor, and wherein dimensions of the tube are selected to limit an acoustic field of view of the surface type detection sensor to provide greater attenuation of secondary returned signals from a soft surface than from a hard surface.

3. The robotic cleaning appliance of claim 1, wherein the processor is further configured to:
   adjust an aspect of operation of the robotic cleaning appliance in a first way based on the surface type being determined to be a hard surface; and
   adjust an aspect of operation of the robotic cleaning appliance in a second way based on the surface type being determined to be a soft surface, wherein the first way and the second way are different.

4. The robotic cleaning appliance of claim 1, wherein the processor is further configured to:
   adjust an aspect of operation of the robotic cleaning appliance based on the surface type being determined to have changed from a previously determined surface type.

5. The robotic cleaning appliance of claim 1, wherein the processor is further configured to:
   detect a malfunction of the robotic cleaning appliance based on the reflectivity metric being determined to have changed beyond a threshold from a previously determined reflectivity metric.

6. The robotic cleaning appliance of claim 1, wherein the surface type detection sensor comprises a floor type detection sensor.

7. The robotic cleaning appliance of claim 1, wherein the sonic signal comprises an ultrasonic signal in a frequency range between 50 kHz and 500 kHz.

8. The robotic cleaning appliance of claim 1, wherein the processor configured to select a window of time after transmission of a sonic signal at the surface such that the returned signals in the selected window of time comprise at least a portion of secondary returned signals comprises:
   the processor being configured to select the window of time such that the returned signals in the selected window of time comprise no primary returned signals.

9. The robotic cleaning appliance of claim 1, wherein the processor configured to select a window of time after transmission of a sonic signal at the surface such that the returned signals in the selected window of time comprise at least a portion of secondary returned signals comprises:
   the processor being configured to select the window of time and an amount of primary signal versus an amount of secondary signal based on a ringdown time of the surface type detection sensor and a round trip time-of-flight (ToF) of primary returned signals.

10. The robotic cleaning appliance of claim 1, wherein the processor configured to process the returned signals falling in the selected window of time to achieve a reflectivity metric comprises:
    the processor being configured to sum the amplitudes of the returned signals falling in the selected window of time to achieve the reflectivity metric.

11. The robotic cleaning appliance of claim 1, wherein the stored value comprises a value obtained and stored while the robotic cleaning appliance is docked.

12. The robotic cleaning appliance of claim 1, wherein the stored value comprises a value obtained from a previous detection of floor by the robotic cleaning appliance.

13. The robotic cleaning appliance of claim 1, wherein the processor configured to, based on the comparison, determine which surface type of a plurality of surface types has been detected by the surface type detection sensor comprises the processor being configured to:
    based on the comparison, determine which surface type of a hard surface and a soft surface has been detected by the surface type detection sensor.

14. A sensor processing unit comprising:
a surface type detection sensor configured to emit sonic signals toward a surface and receive corresponding returned signals from the surface, wherein the returned signals include primary returned signals which are directly reflected and secondary returned signals which are multi-path reflected and return at a later time than the primary returned signals; and
a sensor processor configured to:
select a window of time after transmission of a sonic signal at the surface such that the returned signals falling in the selected window of time comprise at least a portion of secondary returned signals, wherein the selected window of time is related to round trip time-of-flight of the returned signals, and wherein each of the returned signals has an amplitude;
create a reflectivity metric from the returned signals falling in the selected window of time; and
determine, based on the reflectivity metric, which surface type of a plurality of surface types has been detected by the surface type detection sensor.

15. The sensor processing unit of claim 14, wherein the sensor processor configured to select a of a window of time after transmission of a sonic signal at the surface such that the returned signals in the selected window of time comprise at least a portion of secondary returned signals comprises:
the sensor processor being configured to select the window of time such that the returned signals in the selected window of time comprise more secondary returned signals than primary returned signals.

16. The sensor processing unit of claim 14, wherein the sensor processor configured to select a window of time after transmission of a sonic signal at the surface such that the returned signals in the selected window of time comprise at least a portion of secondary returned signals comprises:
the sensor processor being configured to select the window of time such that the returned signals in the selected window of time comprises nth order reflected signals, where n is greater than 2 and less than 6.

17. The sensor processing unit of claim 14, wherein the sensor processor configured to select a window of time after transmission of a sonic signal at the surface such that the returned signals in the selected window of time comprise at least a portion of secondary returned signals comprises:
the sensor processor being configured to select the window of time and an amount of primary signal versus an amount of secondary signal based on a ringdown time of the surface type detection sensor and a round trip time-of-flight (ToF) of primary returned signals.

18. The sensor processing unit of claim 14, wherein the sensor processor configured to select a window of time after transmission of a sonic signal at the surface such that the returned signals in the selected window of time comprise at least a portion of secondary returned signals comprises:
the sensor processor being configured to select the window of time which includes at least a portion of a period of maximum change in the returned signals.

19. The sensor processing unit of claim 14, wherein the sensor processor configured to determine, based on the reflectivity metric, which surface type of a plurality of surface types has been detected by the surface type detection sensor comprises:
the sensor processor being configured to determine which surface type of a hard surface and a soft surface has been detected by the surface type detection sensor.

20. A method of surface type detection comprising:
receiving, by a processor coupled with a surface type detection sensor, returned signals from the surface type detection sensor, wherein the surface type detection sensor is configured to emit sonic signals toward a surface being operated upon by a device and receiving corresponding returned signals from the surface, and wherein the returned signals include primary returned signals which are directly reflected and secondary returned signals which are multi-path reflected and return at a later time than the primary returned signals;
selecting, by the processor, a window of time after transmission of a sonic signal at the surface such that the returned signals falling in the selected window of time comprise at least a portion of secondary returned signals, wherein the selected window of time is related to round trip time-of-flight of the returned signals, and wherein each of the returned signals has an amplitude;
creating a reflectivity metric from the returned signals falling in the selected window of time; and
determining, by the processor based on the reflectivity metric, which surface type of a plurality of surface types has been detected by the surface type detection sensor.

21. The method as recited in claim 20, wherein the receiving, by a processor coupled with a surface type detection sensor, returned signals from the surface type detection sensor comprises:
receiving, by the processor, the returned signals via a tube disposed with a first opening of the tube coupled to the surface type detection sensor, wherein the tube is configured to direct the emitted sonic signals through the tube and out of a second opening toward the surface and to direct returned signals from the surface through the second opening of the tube and back to the surface type detection sensor, and wherein dimensions of the tube are selected to limit an acoustic field of view of the surface type detection sensor to provide greater attenuation of secondary returned signals from a soft surface than from a hard surface.

22. The method as recited in claim 20, wherein the selecting of a window of time after transmission of a sonic signal at the surface such that the returned signals in the selected window of time comprise at least a portion of secondary returned signals comprises:
selecting, by the processor, the window of time such that the returned signals in the selected window of time comprise no primary returned signals.

23. The method as recited in claim 20, wherein the selecting of a window of time after transmission of a sonic signal at the surface such that the returned signals in the selected window of time comprise at least a portion of secondary returned signals comprises:
selecting, by the processor, the window of time and an amount of primary signal versus an amount of secondary signal based on a ringdown time of the surface type detection sensor and a round trip time-of-flight (ToF) of primary returned signals.

24. The method as recited in claim 20, wherein the selecting of a window of time after transmission of a sonic signal at the surface such that the returned signals in the selected window of time comprise at least a portion of secondary returned signals comprises:
selecting, by the processor, the window of time which includes at least a portion of a period of maximum change in the returned signals.

25. The method as recited in claim 20, wherein the determining, by the processor based on the reflectivity metric, which surface type of a plurality of surface types has been detected by the surface type detection sensor comprises:
    determining, by the processor based on the reflectivity metric, which surface type of a hard surface and a soft surface has been detected by the surface type detection sensor.

\* \* \* \* \*